United States Patent
Wahadaniah et al.

(10) Patent No.: US 9,681,148 B2
(45) Date of Patent: *Jun. 13, 2017

(54) IMAGE CODING METHOD, IMAGE DECODING METHOD, IMAGE CODING APPARATUS, IMAGE DECODING APPARATUS, AND IMAGE CODING AND DECODING APPARATUS

(71) Applicant: Sun Patent Trust, New York, NY (US)

(72) Inventors: Viktor Wahadaniah, Singapore (SG); Chong Soon Lim, Singapore (SG); Sue Mon Thet Naing, Singapore (SG); Hai Wei Sun, Singapore (SG); Takahiro Nishi, Nara (JP); Hisao Sasai, Osaka (JP); Youji Shibahara, Tokyo (JP); Toshiyasu Sugio, Osaka (JP); Kyoko Tanikawa, Osaka (JP); Toru Matsunobu, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/336,075

(22) Filed: Oct. 27, 2016

(65) Prior Publication Data
US 2017/0048538 A1 Feb. 16, 2017

Related U.S. Application Data

(63) Continuation of application No. 14/603,769, filed on Jan. 23, 2015, which is a continuation of application
(Continued)

(51) Int. Cl.
H04N 19/70 (2014.01)
H04N 19/50 (2014.01)
(Continued)

(52) U.S. Cl.
CPC ............ *H04N 19/50* (2014.11); *H04N 19/15* (2014.11); *H04N 19/58* (2014.11); *H04N 19/172* (2014.11); *H04N 19/174* (2014.11)

(58) Field of Classification Search
CPC ...................................... H04N 19/70
See application file for complete search history.

(56) References Cited

U.S. PATENT DOCUMENTS 7,782,943 B2   8/2010 Jeon et al.
8,040,949 B2   10/2011 Cosman
(Continued)

FOREIGN PATENT DOCUMENTS

CN   101449585   6/2009
CN   101841708   9/2010
(Continued)

OTHER PUBLICATIONS

NPL—Absolute signaling of reference pictures; Torino 2011.*
(Continued)

*Primary Examiner* — William C Vaughn, Jr.
*Assistant Examiner* — Luis Perez Fuentes
(74) *Attorney, Agent, or Firm* — Wenderoth, Lind & Ponack, L.L.P.

(57) ABSTRACT

An image coding method includes: writing, into a sequence parameter set, buffer description defining information for defining a plurality of buffer descriptions; selecting one of the buffer descriptions for each processing unit that is a picture or a slice, and writing buffer description selecting information for specifying the selected buffer description, into a first header of the processing unit which is included in the coded bitstream; and coding the processing unit using the selected buffer description, and the buffer description defining information includes long-term information for identifying, among a plurality of reference pictures indicated
(Continued)

in the buffer descriptions, a reference picture to be assigned as a long-term reference picture.

1 Claim, 40 Drawing Sheets

Related U.S. Application Data

No. 13/605,043, filed on Sep. 6, 2012, now Pat. No. 8,971,406.

(60) Provisional application No. 61/531,760, filed on Sep. 7, 2011.

(51) Int. Cl.
H04N 19/15 (2014.01)
H04N 19/58 (2014.01)
H04N 19/172 (2014.01)
H04N 19/174 (2014.01)

(56) References Cited

U.S. PATENT DOCUMENTS

| | | | |
|---|---|---|---|
| 8,615,038 B2 * | 12/2013 | Wang | H04N 19/70 375/240.01 |
| 8,638,847 B2 | 1/2014 | Wang | |
| 8,855,208 B2 | 10/2014 | Wahadaniah | |
| 8,913,665 B2 | 12/2014 | Wahadaniah | |
| 8,971,406 B2 * | 3/2015 | Wahadaniah | H04N 19/70 375/240.02 |
| 9,088,799 B2 | 7/2015 | Wahadaniah | |
| 9,232,233 B2 | 1/2016 | Zhou | |
| 9,319,679 B2 * | 4/2016 | Ramasubramonian | H04N 19/58 |
| 9,432,665 B2 * | 8/2016 | Wang | H04N 19/50 |
| 2006/0083298 A1 | 4/2006 | Wang et al. | |
| 2006/0120463 A1 | 6/2006 | Wang | |
| 2009/0216964 A1 | 8/2009 | Palladino et al. | |
| 2009/0262804 A1 | 10/2009 | Pandit et al. | |
| 2010/0020885 A1 | 1/2010 | Yuan et al. | |
| 2010/0034254 A1 | 2/2010 | Wang | |
| 2010/0238822 A1 | 9/2010 | Koyabu et al. | |
| 2011/0080949 A1 | 4/2011 | Takahashi et al. | |
| 2012/0224774 A1 | 9/2012 | Lim et al. | |
| 2013/0077681 A1 * | 3/2013 | Chen | H04N 19/105 375/240.12 |
| 2013/0094585 A1 | 4/2013 | Misra et al. | |
| 2013/0114687 A1 | 5/2013 | Kim et al. | |
| 2013/0215975 A1 * | 8/2013 | Samuelsson | H04N 19/70 375/240.25 |
| 2014/0126640 A1 | 5/2014 | Samuelsson et al. | |

FOREIGN PATENT DOCUMENTS

| | | |
|---|---|---|
| CN | 102036066 | 4/2011 |
| EP | 1 381 238 | 1/2004 |
| EP | 1 802 126 | 6/2007 |
| EP | 2 290 985 | 3/2011 |
| EP | 2 393 296 | 12/2011 |
| TW | 200627962 | 8/2006 |
| WO | 2005/076613 | 8/2005 |
| WO | 2007/114610 | 10/2007 |
| WO | 2010/087157 | 8/2010 |

OTHER PUBLICATIONS

Rickard Sjoberg et al., "Absolute signaling of reference pictures", Joint Collaborative Team of Video Coding (JCT-VC) of ITU-T SG16 WP3 and ISO/IEC JTC1/SC29/WG11, JCTVC-F493, 6th Meeting: Torino, 2011, XP003031157.
Rickard Sjoberg et al., "Proposed changes to the HEVC Working Draft", Joint Video Team (JCT) of ISO/IEC MPEG and ITU-T VCEG (ISO/IEC JTC1/SC29/WG11 and ITU-T SG16 Q6), [Online] No. JCTVC-F493, Jul. 22, 2011, pp. 1-28, XP007922938.
Rickard Sjoberg et al., "Absolute signaling Reference Pictures", Joint Video Team (JCT) of ISO/IEC MPEG and ITU-T VCEG (ISO/IEC JTC1/SWC29/Wg11 and ITU-T SG16 Q6) [Online] No. JCTVC-F493_v8, Jul. 22, 2011, pp. 1-29, XP007922937.
Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, 5$^{th}$ Meeting: Geneva, CH, Mar. 16-23, 2011.
Stephan Wenger, "Parameter set updates using conditional replacement", Joint Collaborative Team on Video Coding (JCT-VC) of ITU-T SG16 WP3 and ISO/IEC JTC1/SC29/WG11, JCTVC-E309, 5$^{th}$ Meeting: Geneva, CH, Mar. 16-23, 2011.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d0, Ver. 1, 6$^{th}$ Meeting: Torino, IT, Jul. 14-22, 2011, pp. 34, 35, 38-40, 60-66, and 68-70.
ISO/IEC 14496-10 (MPEG-4, Information technology—Coding of audio-visual objects—Part 10: Advanced Video Coding), Second edition, Oct. 1, 2004, pp. 31, 32, 35, 36, 39, 54-59, 61-67, and 69-71.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d0, Ver.1, 6th Meeting: Torino, IT, Jul. 14-22, 2011.
Rickard Sjoberg et al., "Absolute signaling of reference pictures", Joint Collaborative Team of Video Coding (JCT-VC) of ITU-T SG16 WP3 and ISO/IEC JTC1/SC29/WG11, JCTVC-F493, 6th Meeting: Torino, 2011, XP003031157.
Rickard Sjoberg et al., "Proposed changes to the HEVC Working Draft", Joint Video Team (JVT) of ISO/IEC MPEG and ITU-T VCEG (ISO/IEC JTC1/SC29/WG11 and ITU-T SG16 Q6), [Online] No. JCTVC-F493, Jul. 22, 2011, pp. 1-28, XP007922938.
Rickard Sjoberg et al., "Absolute signaling Reference Pictures", Joint Video Team (JVT) of ISO/IEC Mpeg and ITU-T VCEG (ISO/TEC JTC1/SWC29/WG11 and ITU-T SG16 Q6) [Online] No. JCTVC-F493_v8, Jul. 22, 2011, pp. 1-29, XP007922937.
Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, 5$^{th}$ Meeting: Geneva, CH, Mar. 16-23, 2011.
Stephan Wenger, "Parameter set updates using conditional replacement", Joint Collaborative Team on Video Coding (JCT-VC) of ITU-T SG16 WP3 and ISO/IEC JTC1/SC29/WG11, JCTVC-E309, 5$^{th}$ Meeting: Geneva, CH, Mar. 16-23, 2011.
Gary Sullivan et al, "Proposal on Decoded Picture Buffer Description Syntax Relating to AHG21 and JCTVC-F493", Joint Collaborative Team on Video Coding (JCT-VC) of ITU-T SG16 WP3 and ISO/IEC JTC1/SC29/WG11, JCTVC-G788, 7th Meeting: Geneva, CH, Nov. 21-30, 2011.
Extended European Search Report issued Jan. 5, 2015 in European Application No. 12825464.6.
International Search Report issued Dec. 11, 2012 in corresponding International Application No. PCT/JP2012/005608.
Rickard Sjoberg, Jonatan Samuelsson, "Absolute signaling of reference pictures", Joint Collaborative Team on Video Coding (JCT-VC) of ITU-T SG16 WP3 and ISO/IEC JTC1/SC29/WG11 6$^{th}$ Meeting: Torino, Jul. 18, 2011, JCTVC-F493.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d0, Ver. 1, 6th Meeting: Torino, IT, Jul. 14-22, 2011, pgs. 34, 35, 38-40, 60-66, and 68-70.
International Search Report issued Dec. 11, 2012 in International (PCT) Application No. PCT/JP2012/005676.
International Search Report issued Jan. 8, 2013 in International (PCT) Application No. PCT/JP2012/006235.
International Search Report issued Nov. 27, 2012 in International (PCT) Application No. PCT/JP2012/005329.

(56) References Cited

OTHER PUBLICATIONS

ISO/IEC 14496-10 (MPEG-4, Information technology—Coding of audio-visual objects—Part 10: Advanced Video Coding), Second edition, Oct. 1, 2004, pgs. 31, 32, 35, 36, 39, 54-59, 61-67, and 69-71.
Preliminary Report on Patentability from WIPO issued Feb. 4, 2014 in International (PCT) Application No. PCT/JP2012/006235.
Preliminary Report on Patentability from WIPO issued Dec. 24, 2013 in International (PCT) Application No. PCT/JP2012/005329.
Office Action issued Sep. 23, 2013 in U.S. Appl. No. 13/622,046.
Office Action issued Dec. 9, 2013 in U.S. Appl. No. 13/605,043.
Office Action issued Apr. 24, 2014 in U.S. Appl. No. 13/605,043.
Notice of Allowance issued Aug. 22, 2014 in U.S. Appl. No. 13/605,043.
Notice of Allowance issued Oct. 7, 2014 in U.S. Appl. No. 13/605,043.
Extended European Search Report issued Feb. 3, 2015 in European Application No. 12829722.3.
Rickard Sjoberg et al., "Absolute signaling of reference pictures", Joint Collaborative Team on Video Coding (JCT-VC) of ITU-T SG16 WP3 and ISO/IEC JTC1/SC29/WG11, JCTVC-F493, 6th Meeting: Torino, IT, Jul. 1, 2011.
Viktor Wahadaniah et al., "AHG21: Construction and modification of predefined reference picture sets and reference picture lists", Joint Collaborative Team on Video Coding (JCT-VC) of ITU-T SG16 WP3 and ISO/IEC JTC1/SC29/WG11, JCTVC-G548, 7$^{th}$ Meeting: Geneva, CH, Nov. 21-30, 2011.
Qiu Shen et al., "Buffer Requirement Analysis and Reference Picture Marking for Temporal Scalable Video Coding", IEEE, 2007, pp. 1-7.
Extended European Search Report issued Feb. 27, 2015 in European Application No. 12841179.0.
Chih-Wei Hsu et al., "Unified Syntax of Reference Picture List Reordering", Joint Collaborative Team on Video Coding (JCT-VC) of ITU-T SG16 WP3 and ISO/IEC JTC1/SC29/WG11, JCTVC-E053, 5th Meeting: Geneva, CH, Mar. 16-23, 2011, XP030008559.
Extended European Search Report issued Mar. 9, 2015 in European Application No. 12832999.2.
Rickard Sjöberg et al., "Absolute signaling of reference pictures", Joint Collaborative Team on Video Coding (JCT-VC) of ITU-T SG16 WP3 and ISO/IEC JTC1/SC29/WG11, JCTVC-F493, WG11 Number: m20923, 6th Meeting: Torino, Jul. 22, 2011, XP030049486.
Ying Chen et al., "Support of lightweight MVC to AVC transcoding", Joint Video Team (JVT) of ISO/IEC MPEG & ITU-T VCEG (ISO/IEC JTC1/SC29/WG11 and ITU-T SG16 Q.6), Jvt-AA036, Filename: JVT-AA036.doc, 27th Meeting: Geneva, CH, Apr. 24-29, 2008, XP03007379.
Chih-Wei Hsu et al., "Unified Syntax of Reference Picture List Reordering", Joint Collaborative Team on Video Coding (JCT-VC) of ITU-T SG16 WP3 and ISO/IEC JTC1/SC29/WG11, JCTVC-E053, 5th Meeting: Geneva, CH, Mar. 16-23, 2011, XP030048128.
Peter Borgwardt et al., "Multi-picture Buffer Semantics for Interlaced Coding", Joint Video Team (JVT) of ISO/IEC MPEG & ITU-T VCEG (ISO/IEC JTC1/SC29/WG11 and ITU-T SG16 Q.6), JVT-0049, Filename: JVT-C049.doc, 3rd Meeting, Fairfax, Virginia, USA, May 6-10, 2002, XP030005158.
Official Communication dated Jul. 22, 2016 in European Patent Application No. 12841179.0.
Wiegand et al., "Proposed editorial changes to H. 263++Annex U," 10. VCEG, No. Q15-J-49 ITU Telecommunication Standardization Sector, MEETING May 16-18, 2000, Osaka, Japan XP030003075.
Office Action dated Aug. 5, 2016 in U.S. Appl. No. 14/239,662.
Chih-Wei Hsu et al., "Unified Syntax of Reference Picture List Reordering", Joint Collaborative Team on Video Coding (JCT-VC) of ITU-T SG16 WP3 and ISO/IEC TTC1/SC29/WG11, 5th Meeting: Geneva, CH, Mar. 16-23, 2011, JCTVC-E053.
Office Action with Search Report issued Aug. 29, 2016 in Chinese Patent Application No. 201280031715.2, with English translation of Search Report.
Wahadaniah et al. "AHG21: Construction and modification of predefined reference picture sets and reference picture lists", Joint Collaborative Team on Video Coding (JCT-VC) of ITU-T SG16 WP3 and ISO/IEC JTC1/SC29/WG11, 7th Meeting: Geneva, CH, Nov. 21-30, 2011, JCTVC-G548, Date Saved: Nov. 23, 2011, P1-P4.
Extended European Search Report issued Sep. 28, 2016 in European Patent Application No. 16176917.9.

\* cited by examiner

FIG. 20

```
slice_header( ) {
    ...
    short_term_ref_pic_set_sps_flag
    if( !short_term_ref_pic_set_sps_flag )
        short_term_ref_pic_set( num_short_term_ref_pic_sets )
    else
        short_term_ref_pic_set_idx
    if( long_term_ref_pics_present_flag ) {
        if( num_long_term_ref_pics_sps > 0 )
            num_long_term_sps
        num_long_term_pics
        for( i = 0; i < num_long_term_sps + num_long_term_pics; i++ ) {
            if( i < num_long_term_sps )
                lt_idx_sps[ i ]
            else {
                poc_lsb_lt[ i ]
                used_by_curr_pic_lt_flag[ i ]
            }
            delta_poc_msb_present_flag[ i ]
            if( delta_poc_msb_present_flag[ i ] )
                delta_poc_msb_cycle_lt[ i ]
        }
    }
}
```

334 — short_term_ref_pic_set_idx
406 — lt_idx_sps[ i ]
407 — poc_lsb_lt[ i ]
405 { 406, 407 }
323D

FIG. 28

| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 31
Stream of TS packets
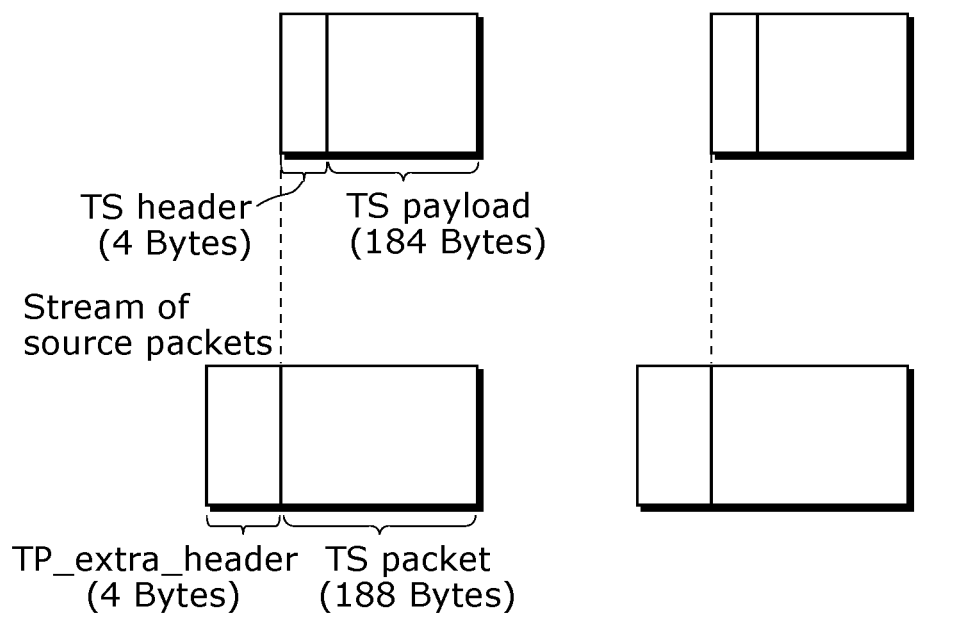
TS header (4 Bytes)  TS payload (184 Bytes)
Stream of source packets
TP_extra_header (4 Bytes)  TS packet (188 Bytes)
Multiplexed data
SPN 0 1 2 3 4 5 6 7 ...
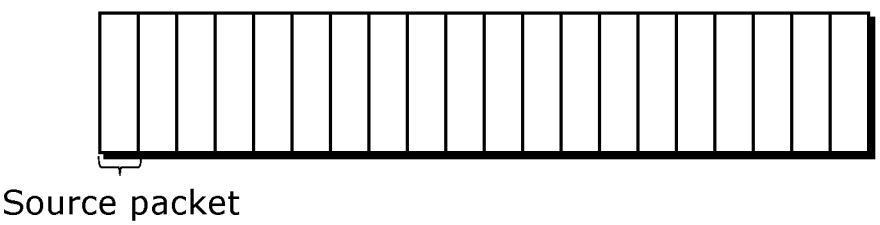
Source packet

FIG. 39

| Corresponding standard | Driving frequency |
|---|---|
| MPEG-4 AVC | 500 MHz |
| MPEG-2 | 350 MHz |
| ⋮ | ⋮ |

IMAGE CODING METHOD, IMAGE DECODING METHOD, IMAGE CODING APPARATUS, IMAGE DECODING APPARATUS, AND IMAGE CODING AND DECODING APPARATUS

FIELD

The present disclosure relates to image coding methods, image decoding methods, image coding apparatuses, image decoding apparatuses, and image coding and decoding apparatuses, and particularly to an image coding method and an image decoding method each of which uses a buffer description for specifying a picture to be held in a buffer.

BACKGROUND

State-of-the-art video coding schemes, such as MPEG-4 AVC/H.264 (see Non Patent Literature 1) and the upcoming HEVC (High-Efficiency Video Coding), perform coding of image or video content using inter-picture prediction from previously coded or decoded reference pictures. In other words, the video coding schemes exploit the information redundancy across consecutive pictures in time. In MPEG-4 AVC video coding scheme, reference pictures in the decoded picture buffer (DPB) are managed either using a predefined sliding-window scheme for removing earlier pictures in coding order from the DPB, or explicitly using a number of buffer management signals in the coded bitstream to manage and remove unused reference pictures.

CITATION LIST

Non Patent Literature

[Non Patent Literature 1] ISO/IEC 14496-10 "MPEG-4 Part 10 Advanced Video Coding"

SUMMARY

Technical Problem

In the image coding method and the image decoding method which adopt such video coding schemes, there are demands for a further improvement in coding efficiency.

Thus, one non-limiting and exemplary embodiment provides an image coding method or an image decoding method in which the coding efficiency can improve.

Solution to Problem

An image coding method according to an aspect of the present disclosure is an image coding method for generating a coded bitstream by coding an image using a buffer description for specifying a picture to be held in a buffer, the image coding method comprising: writing, into a sequence parameter set, buffer description defining information for defining a plurality of buffer descriptions; selecting one of the buffer descriptions for each processing unit that is a picture or a slice, and writing, into a first header of the processing unit, buffer description selecting information for specifying the selected buffer description, the first header being included in the coded bitstream; and coding the processing unit using the selected buffer description, wherein the buffer description defining information includes long-term information for identifying, among a plurality of reference pictures indicated in the buffer descriptions, a reference picture to be assigned as a long-term reference picture.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The present disclosure provides an image coding method or an image decoding method in which the coding efficiency can improve.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 20 shows a syntax structure of a slice header according to Embodiment 4 of the present disclosure.

FIG. 28 illustrates a structure of multiplexed data.

FIG. 31 shows a structure of TS packets and source packets in the multiplexed data.

FIG. 39 shows an example of a look-up table in which video data standards are associated with driving frequencies.

DESCRIPTION OF EMBODIMENTS (Underlying Knowledge Forming Basis of the Present Disclosure)

Recent developments in the HEVC video coding scheme include the introduction of DPB management using buffer descriptions. The buffer descriptions are also called a reference picture set. The buffer description defines the pictures that are retained in the DPB, instead of defining the pictures that are to be removed from the DPB. In other words, the buffer description is a list of picture identifiers indicating all reference pictures stored in the DPB. Furthermore, the buffer description is an absolute description of a plurality of reference pictures stored in a buffer which are to be used in a process of decoding the coded pictures to be processed currently or in the future. Each item in this list is referred to as a buffer element. A buffer element contains a picture identifier unique to each picture, such as a picture order count (POC) number, and additional information of the picture such as a temporal_id value.

This buffer description is activated at the start of coding or decoding of a picture. Pictures that are not included in the active buffer description are removed from the DPB. Benefits of this buffer description include improved robustness against transmission/delivery losses and simplified handling of non-existent pictures.

Figure 1:
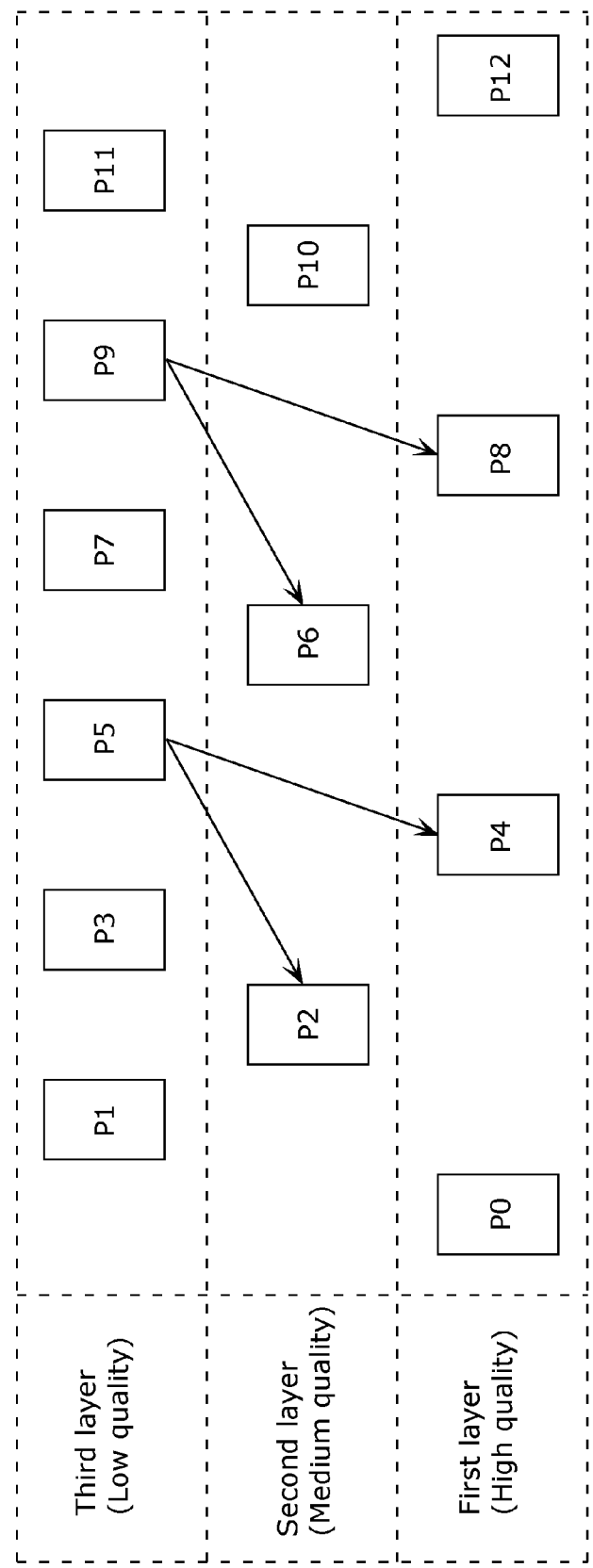
FIG. 1 shows an example of a picture referencing structure.

In some cases, multiple pictures in a video sequence share the same picture referencing structure. For example, a low delay coding structure uses a periodic clustering structure in which the same layer structure is periodically repeated in unit of four pictures as shown in FIG. 1. This repeating unit (that is four pictures herein) is called a cluster.

In the example shown in FIG. 1, the picture numbers (P0 to P12) indicate both unique coding order and unique display or output order of pictures. The pictures P0, P4, P8 and P12 constitute the first layer of pictures. These pictures are coded with the highest quality, for example, by applying quantization least strongly. Pictures P2, P6 and P10 constitute the second layer. These pictures are coded with lower quality than the first layer. Pictures P1, P3, P5, P7, P9 and P11 constitute the third layer. These pictures are coded with the lowest quality. In such a periodic referencing structure, pictures located at the same relative position within their clusters (for example P1, P5 and P9) usually use the same relative picture referencing structure. For example, the picture P5 uses the pictures P4 and P2 as reference pictures, while the picture P9 uses the pictures P8 and P6 as reference pictures.

In order to accommodate periodic clustering structures such as the above structure, a conceivable approach is periodic signaling of buffer descriptions. This buffer description specifies the temporal distances or positions of the reference pictures relative to a target picture to be coded or decoded. By so doing, the reference pictures stored in the DPB can be specified. For example, this buffer description is signalled once in the picture parameter set (PPS). This buffer description is then referred to repeatedly in the slice headers of the pictures having the same relative position within a cluster. For example, a buffer description specifying relative positions of {−1, −3} can be used in both P5 to specify {P4, P2} as reference pictures and by P9 to specify {P8, P6} as reference pictures.

Figure 2:
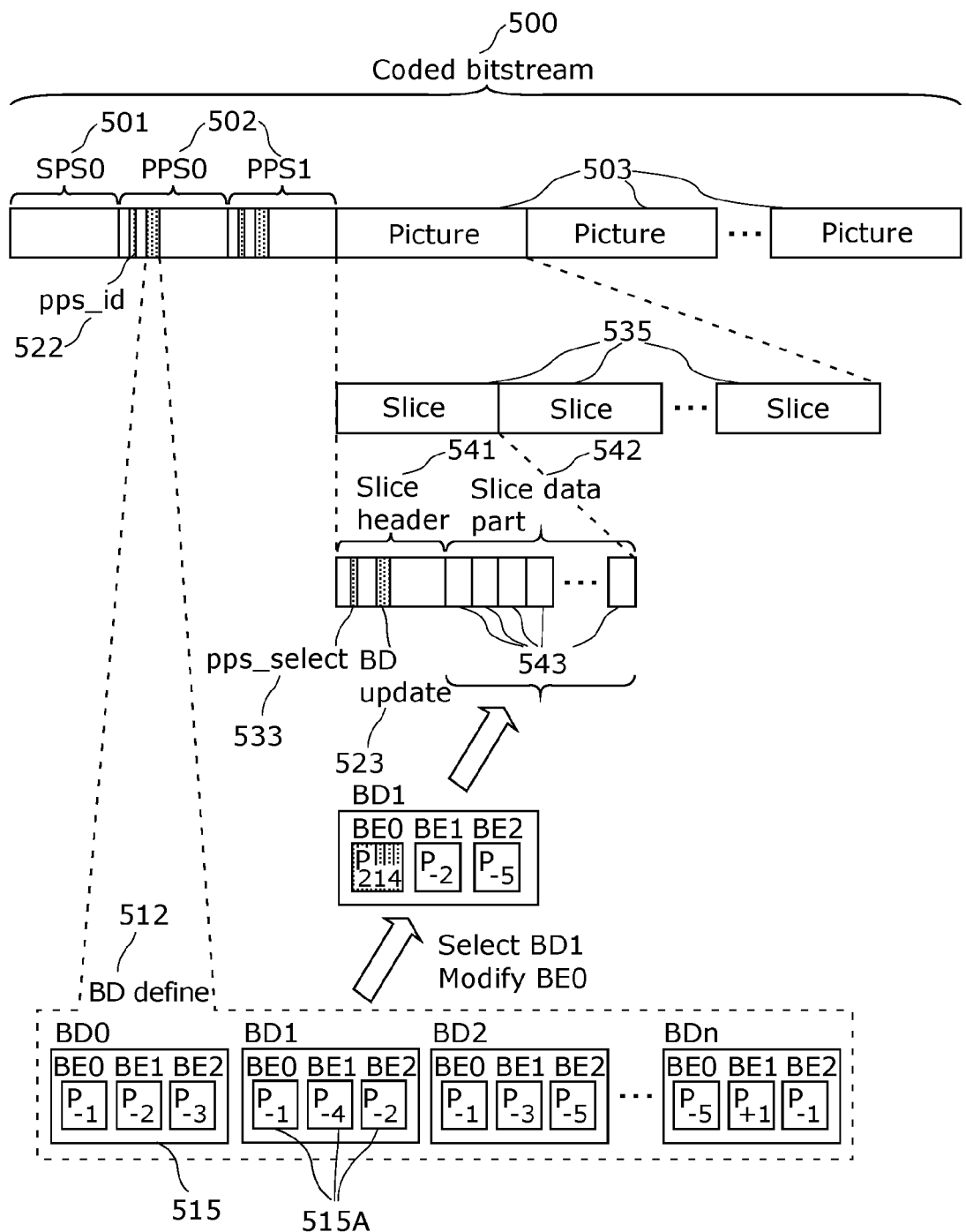
FIG. 2 shows a structure of a coded bitstream.

FIG. 2 shows an example of the signaling structure of buffer description in this case. A coded bitstream 500 shown in FIG. 2 includes a sequence parameter set (SPS) 501 (SPS0), a plurality of picture parameter sets (PPSs) 502 (PPS0 and PPS1), and a plurality of picture data 503. Each of the picture data 503 includes a plurality of slice data 535. Each of the slice data 535 includes a slice header 541 and a slice data part 542. The slice data part 542 includes a plurality of coding unit (CU) data 543.

Each of the PPSs 502 includes a PPS identifier 522 (pps_id) and buffer description defining information 512 (BD define). The buffer description defining information 512 indicates a plurality of buffer descriptions 515 (BD0 to BDn). Each of the buffer descriptions 515 includes a plurality of buffer elements 515A (BE0 to BE2).

Thus, the plurality of buffer descriptions 515 are defined using the buffer description defining information 512 in the picture parameter sets 502. Each of the PPSs 502 is identified by a PPS identifier 522 unique to the PPS.

The slice header 541 includes PPS selecting information 533 (pps_select) and buffer description updating information 523 (BD update).

The PPS selecting information 533 indicates the PPS 502 referred to during coding or decoding of the slice. In the example in FIG. 2, pps_select=0 is satisfied, and the PPS0 having pps_id=0 is selected.

The buffer description updating information 523 includes information which specifies the buffer description selected out of the buffer descriptions 515. In the example in FIG. 2, the buffer description BD1 is selected. Additionally, the buffer description updating information 523 includes buffer description modifying information. The buffer description modifying information assigns a picture identifier to a selected buffer element 515A within the selected buffer description 515. Here, the picture identifier is specified either using its relative position or using an identifier unique to the picture. The identifier unique to the picture includes, for example, the picture order count (POC) number. In the example in FIG. 2, the picture $P_{214}$ identified by its POC number=214 is assigned to the buffer element BE0 within the buffer description BD1. This modification applies only to the current target slice and does not apply to subsequent slices. When the modification of the same content (e.g. assigning the picture $P_{214}$ to the buffer element BE0) is required in subsequent slices or pictures that use the buffer description BD1, the slice headers of those subsequent slices or pictures shall include the buffer description updating information 523 of the same content.

Recent video coding schemes support the use of long-term reference pictures, which are reference pictures that remain in the DPB for a relatively long period of time and are used as inter-prediction reference pictures for coding a plurality of pictures during this period. In AVC video coding scheme, long-term reference pictures in the DPB are managed using the memory management control operation (MMCO) process.

In the above buffer description, long-term reference pictures are defined and managed in the following manner. A reference picture is regarded as a long-term reference picture when the picture is assigned to a buffer element by specifying its POC number. On the other hand, a picture is regarded as a non-long-term (short-term) reference picture when the picture is assigned to a buffer element by specifying the relative distance (POC distance) to a target picture. A long-term reference picture remains in the DPB as long as every consecutive buffer description includes it.

The parameters for specifying a long-term reference picture are available only at the slice header. Therefore, in order to keep a long-term reference picture in the DPB over a range of consecutive pictures, every slice header within the range of consecutive pictures shall contain the buffer description updating information 523 which identifies the long-term reference picture.

Thus, in the above technique, the information for assigning a long-term reference picture applies only to the slice to be coded or decoded. In addition, in order to use the long-term reference picture for a long period of time, the coded bitstream shall include plural pieces of information which indicate the same assignment.

Thus, the inventors found the first problem of a decrease in coding efficiency which is due to repeated information included in the coded bitstream.

Furthermore, in the above technique, a unique picture number (POC number) is used as information identifying the long-term reference picture. This POC number may have a large value and therefore requires many bits. In practice, few long-term reference pictures are used at one time. Hence, it is not necessary to use a large value for identifying each long-term reference picture.

Thus, the inventors found the second problem of a decrease in coding efficiency which is due to many bits being necessary to specify a long-term reference picture.

In order to solve the aforementioned problems, an image coding method according to an aspect of the present disclosure is an image coding method for generating a coded bitstream by coding an image using a buffer description for specifying a picture to be held in a buffer, the image coding method comprising: writing, into a sequence parameter set, buffer description defining information for defining a plurality of buffer descriptions; selecting one of the buffer descriptions for each processing unit that is a picture or a slice, and writing, into a first header of the processing unit, buffer description selecting information for specifying the selected buffer description, the first header being included in the coded bitstream; and coding the processing unit using the selected buffer description, wherein the buffer description defining information includes long-term information for identifying, among a plurality of reference pictures indicated in the buffer descriptions, a reference picture to be assigned as a long-term reference picture.

By so doing, in the image coding method according to an aspect of the present disclosure, the buffer description defining information including the long-term information for assigning a reference picture as a long-term reference picture is written into the sequence parameter set shared by a plurality of pictures, and the buffer description identifier indicating a buffer description to be selected is written into a header of each picture or slice. This allows a reduction in redundant information and thereby allows an improvement in coding efficiency in the image coding method as compared to the case where the information for assigning a reference picture as a long-term reference picture is written into a slice header.

For example, the long-term information may include a first long-term index for identifying the reference picture to be assigned as the long-term reference picture.

For example, the long-term information may further include a unique picture order count (POC) number for specifying a reference picture associated with the first long-term index.

For example, the first header may further include a second long-term index for identifying the reference picture to be assigned as the long-term reference picture.

Furthermore, an image decoding method according to an aspect of the present disclosure is an image decoding method for decoding a coded bitstream using a buffer description for specifying a picture to be held in a buffer, the image decoding method comprising: obtaining, from a sequence parameter set corresponding to the coded bitstream, buffer description defining information for defining a plurality of buffer descriptions; obtaining, from a first header of a processing unit that is a picture or a slice, buffer description selecting information for specifying one of the buffer descriptions, the first header being included in the coded bitstream; and decoding the processing unit using the buffer description specified in the buffer description selecting information, wherein the buffer description defining information includes long-term information for identifying, among a plurality of reference pictures indicated in the buffer descriptions, a reference picture to be assigned as a long-term reference picture.

By so doing, a bitstream coded with improved coding efficiency can be decoded in the image decoding method according to an aspect of the present disclosure.

For example, the long-term information may include a first long-term index for identifying the reference picture to be assigned as the long-term reference picture.

For example, the long-term information may further include a unique picture order count (POC) number for specifying a reference picture associated with the first long-term index.

For example, the first header may further include a second long-term index for identifying the reference picture to be assigned as the long-term reference picture.

Furthermore, an image coding apparatus according to an aspect of the present disclosure is an image coding apparatus for generating a coded bitstream by coding an image using a buffer description for specifying a picture to be held in a buffer, the image coding apparatus comprising writing, into a sequence parameter set, buffer description defining information for defining a plurality of buffer descriptions; and selecting one of the buffer descriptions for each processing unit that is a picture or a slice, and writing, into a first header of the processing unit, buffer description selecting information for specifying the selected buffer description, the first header being included in the coded bitstream, wherein the buffer description defining information includes long-term information for identifying, among a plurality of reference pictures indicated in the buffer descriptions, a reference picture to be assigned as a long-term reference picture, and the image coding apparatus codes the processing unit using the selected buffer description.

By so doing, in the image coding apparatus according to an aspect of the present disclosure, the buffer description defining information including the long-term information for assigning a reference picture as a long-term reference picture is written into the sequence parameter set shared by a plurality of pictures, and the buffer description identifier indicating a buffer description to be selected is written into a header of each picture or slice. This allows a reduction in redundant information and thereby allows an improvement in coding efficiency in the image coding apparatus as compared to the case where the information for assigning a reference picture as a long-term reference picture is written into a slice header.

Furthermore, an image decoding apparatus according to an aspect of the present disclosure is an image decoding apparatus for decoding a coded bitstream using a buffer description for specifying a picture to be held in a buffer, the image decoding apparatus comprising a frame memory control unit configured to perform the following: obtaining, from a sequence parameter set corresponding to the coded bitstream, buffer description defining information for defining a plurality of buffer descriptions; and obtaining, from a first header of a processing unit that is a picture or a slice, buffer description selecting information for specifying one of the buffer descriptions, the first header being included in the coded bitstream, wherein the buffer description defining information includes long-term information for identifying, among a plurality of reference pictures indicated in the buffer descriptions, a reference picture to be assigned as a long-term reference picture, and the image decoding apparatus decodes the coding unit using the buffer description specified in the buffer description selecting information.

By so doing, a bitstream coded with improved coding efficiency can be decoded in the image decoding apparatus according to an aspect of the present disclosure.

Furthermore, an image coding and decoding apparatus according to an aspect of the present disclosure comprises the image coding apparatus and the image decoding apparatus.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments are described in greater detail with reference to the Drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the present disclosure. Therefore, among the structural elements in the following embodiments, structural elements not recited in any one of the independent claims defining the most generic part of the inventive concept are described as arbitrary structural elements.

Four embodiments are described in the following. It will be apparent to those skilled in the art that combinations of these embodiments can be carried out to further increase the usability and adaptability of periodic buffer description definitions.

Embodiment 1

In this embodiment, buffer description defining information including long-term information is written into the SPS. This allows a reduction in redundant information and thereby allows an improvement in coding efficiency as compared to the case where the long-term information is written into a slice header.

[Coding Apparatus]

Figure 3:
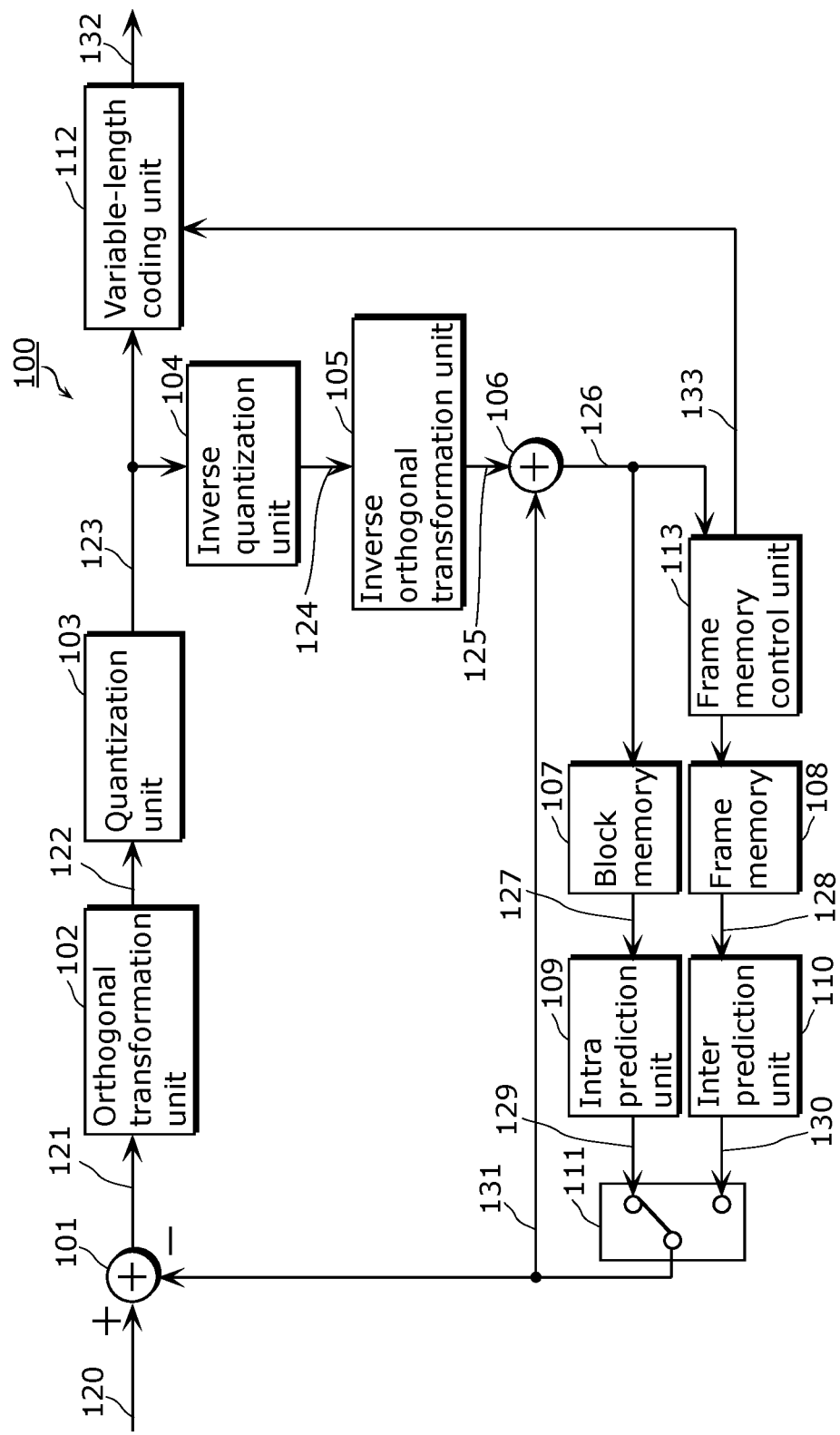
FIG. 3 is a block diagram of an image coding apparatus according to Embodiment 1 of the present disclosure.

FIG. 3 is a block diagram which shows a structure of an image coding apparatus 100 according to this embodiment.

The image coding apparatus 100 codes an input image signal 120 on a block-by-block basis so as to generate a coded bitstream 132. As shown in FIG. 3, the image coding apparatus 100 includes a subtractor 101, an orthogonal transformation unit 102, a quantization unit 103, an inverse quantization unit 104, an inverse orthogonal transformation unit 105, an adder 106, a block memory 107, a frame memory 108, an intra prediction unit 109, an inter prediction unit 110, a picture type determination unit 111, a variable-length coding unit 112, and a frame memory control unit 113.

The input image signal 120 is a video or image bitstream. The subtractor 101 calculates a difference between prediction image data 131 and the input image signal 120, thereby generating prediction error data 121. The orthogonal transformation unit 102 performs orthogonal transformation on the prediction error data 121 to generate frequency coefficients 122. The quantization unit 103 quantizes the frequency coefficients 122, thereby generating quantized values 123. The variable-length coding unit 112 performs entropy coding (variable-length coding) on the quantized values 123, thereby generating the coded bitstream 132.

The inverse quantization unit 104 inversely quantizes the quantized values 123, thereby generating frequency coefficients 124. The inverse orthogonal transformation unit 105 performs inverse orthogonal transformation on the frequency coefficients 122, thereby generating prediction error data 125. The adder 106 adds the prediction error data 125 and the prediction image data 131, thereby generating the decoded image data 126. The block memory 107 holds the decoded image data 126 as decoded image data 127 on a block-by-block basis. The frame memory 108 holds the decoded image data 126 as decoded image data 128 on a frame-by-frame basis.

The intra prediction unit 109 performs intra prediction to generate prediction image data 129 of a current block to be coded. Specifically, the intra prediction unit 109 searches within the decoded image data 127 stored in the block memory 107, and estimates an image area which is most similar to the input image signal 120.

The inter prediction unit 110 performs inter prediction using the per-frame decoded image data 128 stored in the frame memory 108, to generate prediction image data 130 of the current block.

The picture type determination unit 111 selects one of the prediction image data 129 and the prediction image data 130 and outputs the selected data as the prediction image data 131.

The frame memory control unit 113 manages the decoded image data 128 stored in the frame memory 108. Specifically, the frame memory control unit 113 determines whether the decoded image data 128 is kept in the frame memory 208 or removed from the frame memory 208. Furthermore, the frame memory control unit 113 constructs reference lists to be used by the inter prediction unit 110. Furthermore, the frame memory control unit 113 generates frame memory control information 133 which includes the buffer description defining information. The variable-length coding unit 112 generates the coded bitstream 132 which includes this frame memory control information 133.

[Coding Process]

Next, a description is given to an image coding method which is performed by the image coding apparatus 100 as mentioned above.

Figure 4:
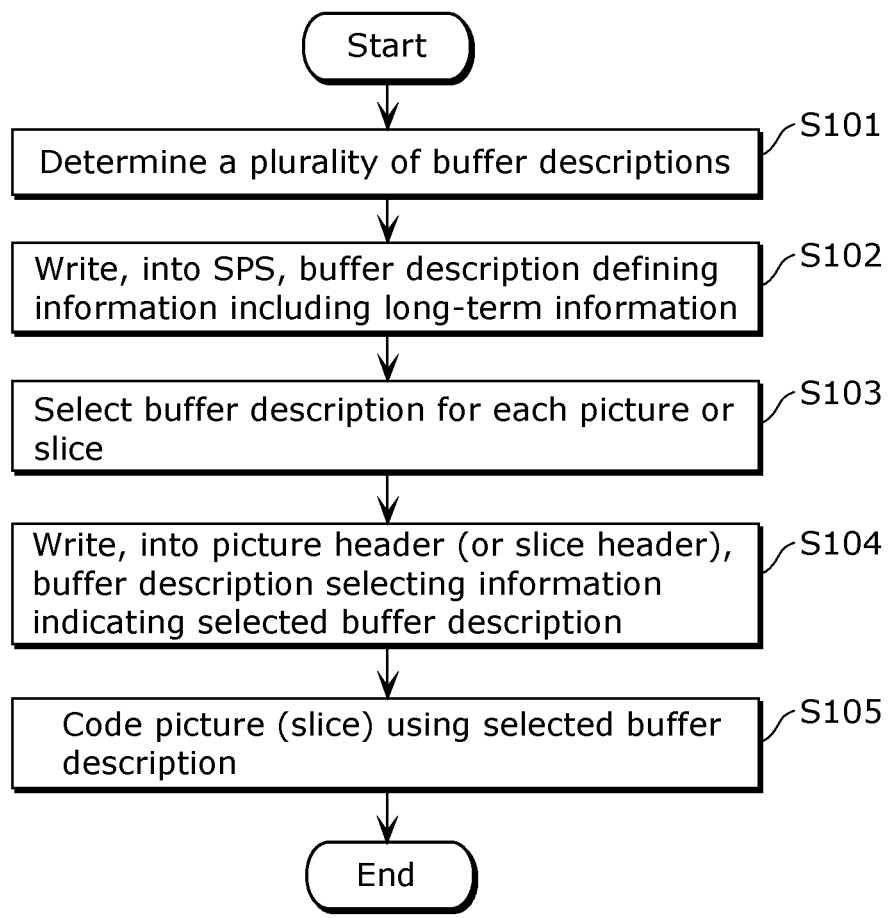
FIG. 4 is a flowchart of an image coding method according to Embodiment 1 of the present disclosure.

FIG. 4 is a flowchart of an image coding method according to this embodiment. Furthermore, FIG. 4 shows a coding process which is performed on a single video sequence including a plurality of pictures.

Firstly, the image coding apparatus 100 determines a plurality of buffer descriptions which are to be used over a plurality of pictures in a video sequence (S101). The buffer descriptions are used to specify pictures to be held in the buffer (frame memory). Specifically, each of the buffer descriptions includes a plurality of buffer elements. Each buffer element contains a unique picture identifier corresponding to one reference picture stored in the frame memory. This means that each of the buffer descriptions indicates a plurality of reference pictures stored in the frame memory. The buffer descriptions are also called a reference picture set.

Furthermore, the image coding apparatus 100 determines, among the reference pictures indicated in the buffer descriptions, a reference picture to be assigned as a long-term reference picture.

Here, the long-term reference picture indicates a reference picture that remains in the frame buffer for a relatively long period of time. Other than the long-term reference picture, a normal reference picture that remains in the frame buffer only for a short period of time is called a short-term reference picture. This means that the long-term reference picture is held in the frame buffer for a longer period of time than the short-term reference picture. In other words, the temporal distance of the long-term reference picture from a current picture is longer than that of the short-term reference picture (for example, the absolute value of a difference in the POC number is large).

In addition, part of the details of the coding and decoding processes is different depending on whether the reference picture to be referred to is the long-term reference picture or the short-term reference picture. For example, the usage of a motion vector in inter prediction is different depending on whether the reference picture to be referred to is the long-term reference picture or the short-term reference picture.

Next, the image coding apparatus 100 writes, into a sequence parameter set (SPS) in the coded bitstream 132, the buffer description defining information which defines the determined buffer descriptions (S102). Here, the SPS is a parameter set (header information) in each video sequence. Furthermore, this buffer description defining information includes long-term information which identifies, among the reference pictures indicated in the buffer descriptions, a reference picture to be assigned as the long-term reference picture.

Next, the image coding apparatus 100 selects, for each picture, one of the buffer descriptions which is to be used to code the picture (S103). It is to be noted that the image coding apparatus 100 may select one buffer description for each slice.

Next, the image coding apparatus 100 writes buffer description selecting information which specifies the selected buffer description into a picture header corresponding to the current picture (or a slice header corresponding to the current slice) and included in the coded bitstream 132 (S104).

Finally, the image coding apparatus 100 codes the current picture or slice using the buffer description selected for the current picture or slice and the long-term information (S105). Furthermore, the image coding apparatus 100 generates the coded bitstream 132 which includes the resulting coded data. It is to be noted that the coding using the long-term information specifically means executing the coding process (such as an inter prediction process) and managing the frame buffer, assuming the reference picture indicated in the long-term information as the long-term reference picture.

[Syntax Diagram]

Figure 5:
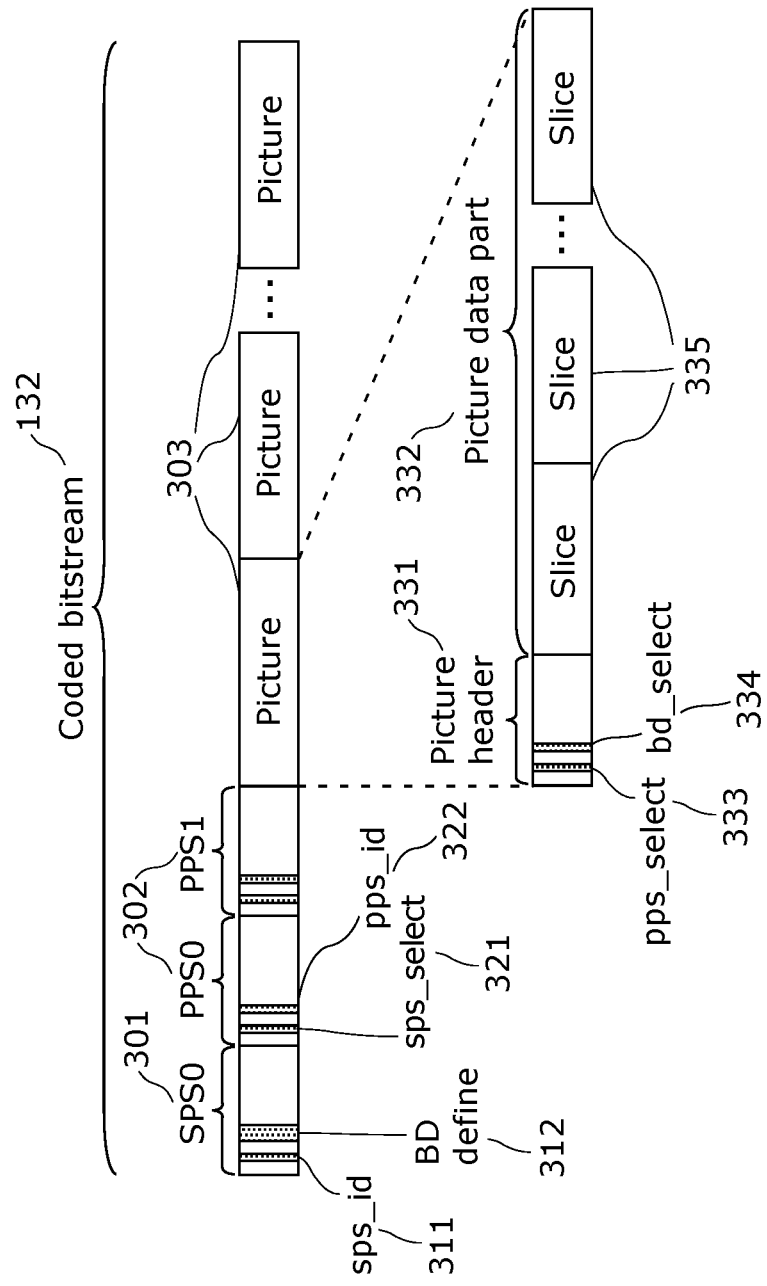
FIG. 5 shows a structure of a coded bitstream according to Embodiment 1 of the present disclosure.
Figure 6:
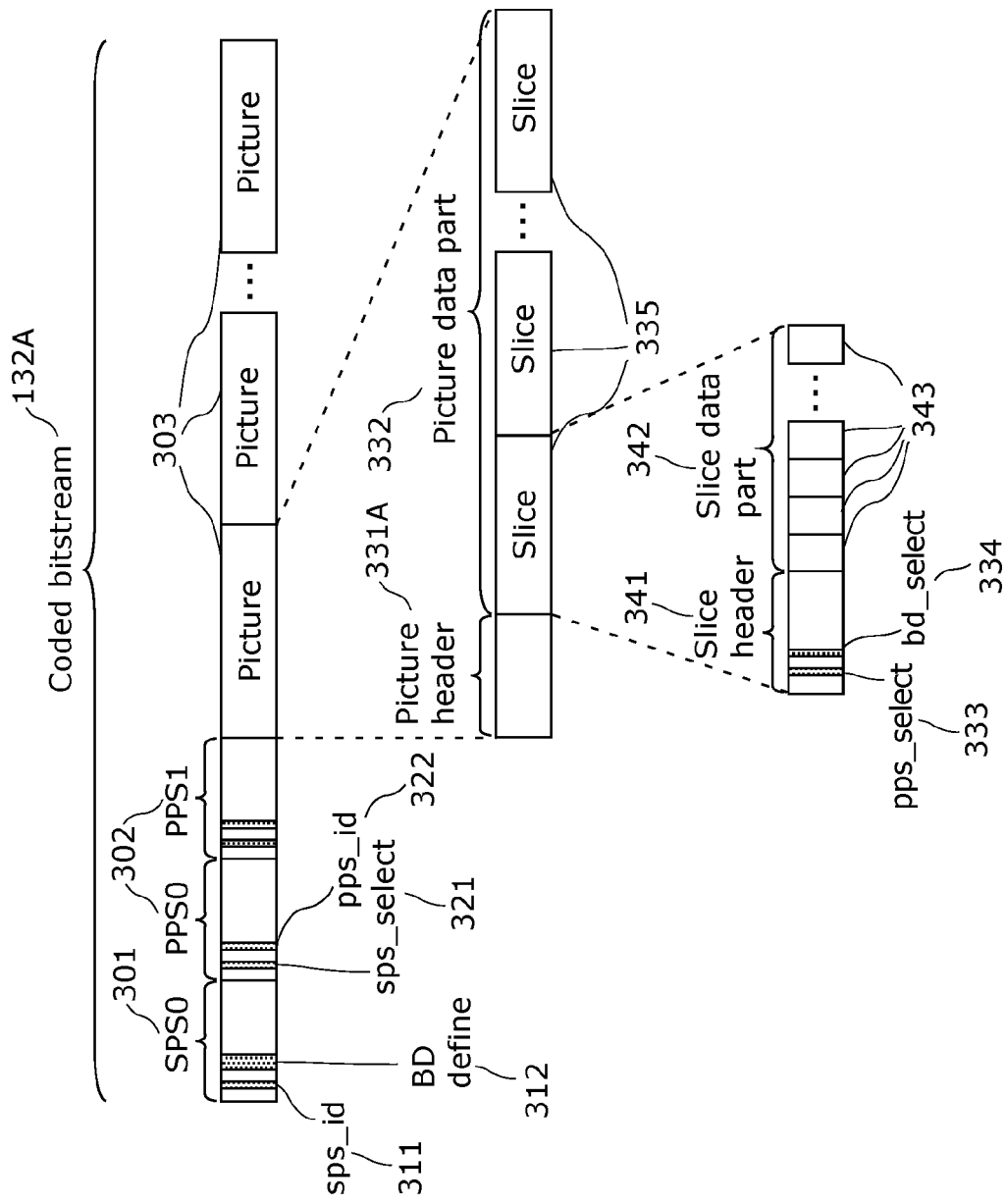
FIG. 6 shows a structure of a coded bitstream according to a variation of Embodiment 1 of the present disclosure.

FIGS. 5 and 6 are each a syntax diagram which shows the location of the buffer description defining information in a coded bitstream in this embodiment. Two exemplary syntax locations are described in the following.

A coded bitstream 132 shown in FIG. 5 includes SPS 301 (SPS0), a plurality of PPSs 302 (PPS0 and PPS1), and a plurality of picture data 303. Each of the picture data 303 includes a picture header 331 and a picture data part 332. The picture data part 332 includes a plurality of slice data 335.

The SPS 301 includes buffer description defining information 312 (BD define) and an SPS identifier 311 (sps_id).

The buffer description defining information 312 defines a plurality of buffer descriptions. For example, like the above-mentioned buffer descriptions 515, the buffer descriptions each include a plurality of buffer elements.

Here, the above buffer description defining information 312 includes the following information:

(1) A parameter (NumOfBD or num_short_term_ref_pic_sets) which indicates the number of buffer descriptions defined in the SPS;

(2) Parameters (NumOfBE[i], num_negative_pics[i] or num_negative_pics[i]) which indicate the number of buffer elements in each buffer description where each index [i] is an index which identifies a buffer description; and (3) Parameters (BE[i][j]) which identify a plurality of reference pictures assigned to buffer elements in each buffer description where each index[j] is an index which identifies a buffer element, that is, BE[i][j] corresponds to a buffer element identified by the index "j" in the buffer description identified by the index "i".

Here, periodic buffer descriptions are defined and created as follows. First, all buffer elements in all buffer descriptions are sequentially selected according to a predetermined recursion. Subsequently, the parameters BE[i][j] for assigning a reference picture to each selected buffer element are repeatedly created.

Each of the PPSs 302 includes SPS selecting information 321 (sps_select) and a PPS identifier 322 (pps_id). The SPS selecting information 321 (e.g. sps_select=0) indicates the SPS301 which is referred to. Furthermore, each of the PPSs 302 is identified by the unique PPS identifier 322 (e.g. pps_id=0).

The picture header 331 includes PPS selecting information (pps_select) 333 and buffer description selecting information 334 (bd_select).

The PPS selecting information 333 (e.g. pps_select=0) indicates the PPS 302 which is referred to. Using this PPS selecting information 333, one of the PPSs 302 is referred to from the picture header 331. Furthermore, using the SPS selecting information 321 included in the PPS 302, the SPS 301 is referred to from the PPS 302 referred to. This links the current picture to the available plurality of buffer descriptions defined in the SPS 301.

With the buffer description selecting information 334 (e.g. bd_select=2), one of the buffer descriptions is specified. Thus, one buffer description is selected out of the plurality of buffer descriptions.

The slice data 335 included in the picture data 303 is coded and decoded using ordered reference pictures according to the selected buffer description.

Furthermore, as shown in FIG. 6, each of the slice data 335 includes a slice header 341 and a slice data part 342. The slice data part 342 includes a plurality of coding unit (CU) data 343.

In a coded bitstream 132A, the PPS selecting information 333 and the buffer description selecting information 334 are not included in a picture header 331A, but are included in the slice header 341. Also in this case, the effects the same as those in the case shown in FIG. 5 can be obtained.

It is to be noted that "slice" in the above explanation may be replaced by "sub-picture unit". The sub-picture unit includes, for example, a tile, an entropy slice, and a group of blocks constituting a wavefront processing sub-picture partition (Wavefront Parallel Processing (WPP) unit).

In this embodiment, for example, in order to assign the long-term reference picture to the buffer element, the picture identifier that is an absolute picture number (such as a POC number) is used. In this case, a reference picture is regarded as a long-term reference picture when the reference picture is identified by a picture identifier in the buffer element. This means that the long-term information included in the buffer description defining information 312 may include a picture identifier which identifies a reference picture to be assigned as the long-term reference picture.

It is to be noted that a long-term index may be used to assign the long-term reference picture to the buffer element. In other words, the above long-term information may include a long-term index which identifies the reference picture to be assigned as the long-term reference picture. Specifically, a unique long-term index is firstly assigned to a reference picture in the frame buffer. Next, the reference picture is selected using the long-term index assigned to the buffer element in the buffer description. This means that the long-term indices are indices which identify a plurality of reference pictures included in the frame buffer. It is to be noted that the long-term index may be an index other than the above. For example, the long-term indices may be indices which identify a plurality of long-term reference pictures.

A reference picture is regarded as a long-term reference picture when the reference picture is identified by a long-term index in the active buffer description. It is to be noted that the long-term information may further include information for associating the long-term index with the reference picture which is identified by the picture identifier (POC number). This means that the long-term information may further include a unique picture identifier (POC number) for specifying a reference picture associated with the long-term index. In other words, the long-term information may include information which indicates a correspondence relationship between the long-term index and the picture identifier (POC number).

When the long-term index having the same value as the value of the long-term index assigned to the first reference picture is assigned to the second reference picture which follows the first reference picture, the long-term index specifies the second reference picture and no longer specifies the first reference picture. For example, the value of the long-term index assigned to the first reference picture included in the first SPS can be directly assigned to the second reference picture included in the second SPS. When the second SPS becomes active, the value of the long-term index specifies not the first reference picture, but the second reference picture.

It is to be noted that both the above picture identifier and the long-term index may be used for assigning a long-term reference picture to a buffer element. In this case, a reference picture is regarded as a long-term reference picture when the reference picture is identified by either a picture identifier or a long-term index.

It is to be noted that the long-term information may be information other than the above as long as it assigns a reference picture as a long-term reference picture. For example, the long-term information may be a flag which indicates whether or not the reference picture indicated by the buffer element is to be assigned as the long-term reference picture. Alternatively, the long-term information may be information which specifies one or more reference pictures to be assigned as long-term reference pictures. For this specifying, at least one of the above-described long-term index and picture identifier (POC number) can be used, for example. Furthermore, the long-term information may be a list for specifying a plurality of long-term reference pictures.

[Effect of Coding Method]

With the foregoing, the image coding apparatus 100 according to this embodiment is capable of preventing redundant repetition of the same parameters for constructing the reference lists in the coded bitstream. This allows the image coding apparatus 100 to improve the coding efficiency of the parameters describing reference list construction. Furthermore, the image coding apparatus 100 is capable of achieving design harmonization of the hierarchically structured signaling units of a coded bitstream.

[Decoding Apparatus]

Figure 7:
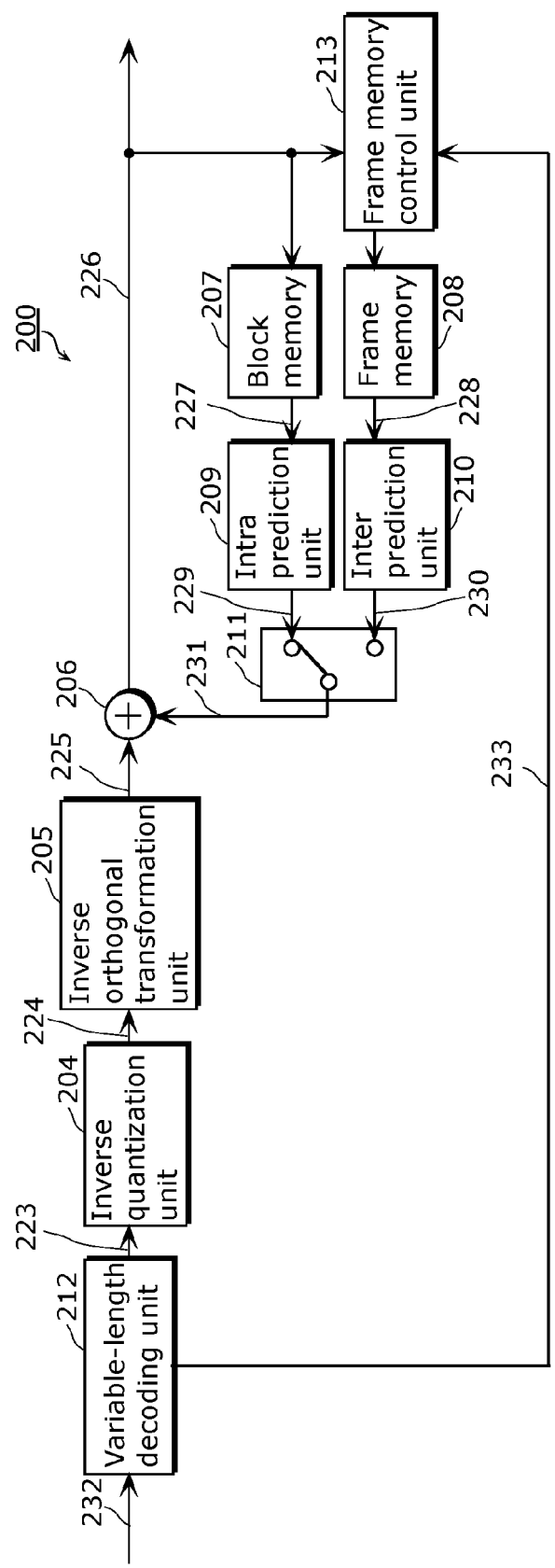
FIG. 7 is a block diagram of an image decoding apparatus according to Embodiment 1 of the present disclosure.

FIG. 7 is a block diagram which shows a structure of an image decoding apparatus 200 according to this embodiment.

The image decoding apparatus 200 shown in FIG. 7 decodes a coded bitstream 232 on a block-by-block basis, thereby generating decoded image data 226. This image decoding apparatus 200 includes a variable-length decoding unit 212, an inverse quantization unit 204, an inverse orthogonal transformation unit 205, an adder 206, a block memory 207, a frame memory 208, an intra prediction unit 209, an inter prediction unit 210, a picture type determination unit 211, and a frame memory control unit 213.

The coded bitstream 232 is, for example, the coded bitstream 132 generated by the above image coding apparatus 100.

The variable-length decoding unit 212 performs variable-length decoding (entropy decoding) on the coded bitstream 232 to generate quantized values 223 and frame memory control information 233. Here, the frame memory control information 233 corresponds to the above frame memory control information 133.

The inverse quantization unit 204 inversely quantizes the quantized values 223, thereby generating frequency coefficients 224. The inverse orthogonal transformation unit 205 performs inverse frequency transform on the frequency coefficients 224, thereby generating prediction error data 225. The adder 206 adds the prediction error data 225 and the prediction image data 231, thereby generating the decoded image data 226. The decoded image data 226 is output from the image decoding apparatus 200 and, for example, is displayed.

The block memory 207 holds the decoded image data 226 as decoded image data 227 on a block-by-block basis. The frame memory 208 holds the decoded image data 226 as decoded image data 228 on a frame-by-frame basis.

The intra prediction unit 209 performs intra prediction to generate prediction image data 229 of a current block to be decoded. Specifically, the intra prediction unit 209 searches within the decoded image data 227 stored in the block memory 207, and estimates an image area which is most similar to the decoded image data 226.

The inter prediction unit 210 performs inter prediction using the per-frame decoded image data 228 stored in the frame memory 208, to generate prediction image data 230 of the current block.

The picture type determination unit 211 selects one of the prediction image data 229 and the prediction image data 230 and outputs the selected data as the prediction image data 231.

The frame memory control unit 213 manages the decoded image data 228 stored in the frame memory 208. Specifically, the frame memory control unit 213 performs memory management processes according to the frame memory control information 223. The frame memory control unit 213 determines whether the decoded image data 128 is kept in the frame memory 208 or removed from the frame memory 208. Furthermore, the frame memory control unit 213 constructs reference lists to be used by the inter prediction unit 210.

[Decoding Process]

Next, a description is given as to an image decoding method which is performed by the image decoding apparatus 200 as mentioned above.

Figure 8:
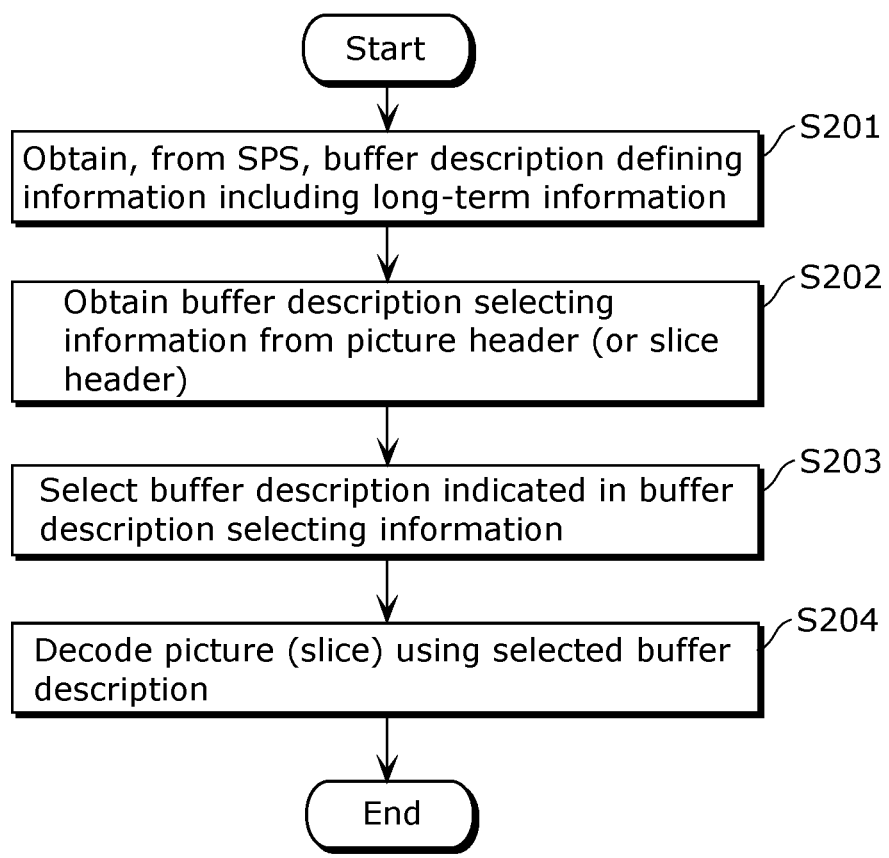
FIG. 8 is a flowchart of an image decoding method according to Embodiment 1 of the present disclosure.

FIG. 8 is a flowchart of the image decoding method according to this embodiment. Furthermore, FIG. 8 shows a decoding process which is performed on a single video sequence including a plurality of pictures.

Firstly, the image decoding apparatus 200 obtains, from the SPS in the coded bitstream 232, buffer description defining information which includes long-term information and defines a plurality of buffer descriptions (S201).

Next, the image decoding apparatus 200 obtains buffer description selecting information from a picture header (or a slice header) in the coded bitstream 232 (S202). For the current picture (or slice), the image decoding apparatus 200 then selects, out of the buffer descriptions, one buffer description specified in the buffer description selecting information (S203).

Finally, the image decoding apparatus 200 decodes the current picture (or slice) using the selected buffer description and the long-term information (S204). It is to be noted that the decoding using the long-term information specifically means executing the decoding process (such as an inter prediction process) and managing the frame buffer, assuming the reference picture indicated in the long-term information as the long-term reference picture.

[Effect of Decoding Method]

With the foregoing, the image decoding apparatus 200 according to this embodiment is capable of decoding a coded bitstream which is coded in the form of improved coding efficiency and harmonized design of buffer description data.

Embodiment 2

This embodiment describes a variation of the above Embodiment 1. The image coding apparatus according to this embodiment further writes, into the PPS, buffer description updating information for modifying the buffer descriptions which includes the long-term information.

The following mainly describes differences from Embodiment 1 and thus omits overlapping explanations.

[Coding Apparatus]

The block diagram of the image coding apparatus 100 according to this embodiment is the same or alike as that shown in FIG. 3 and therefore is not explained.

[Coding Process]

The following describes an image coding method which is performed by the image coding apparatus 100 according to this embodiment.

Figure 9:
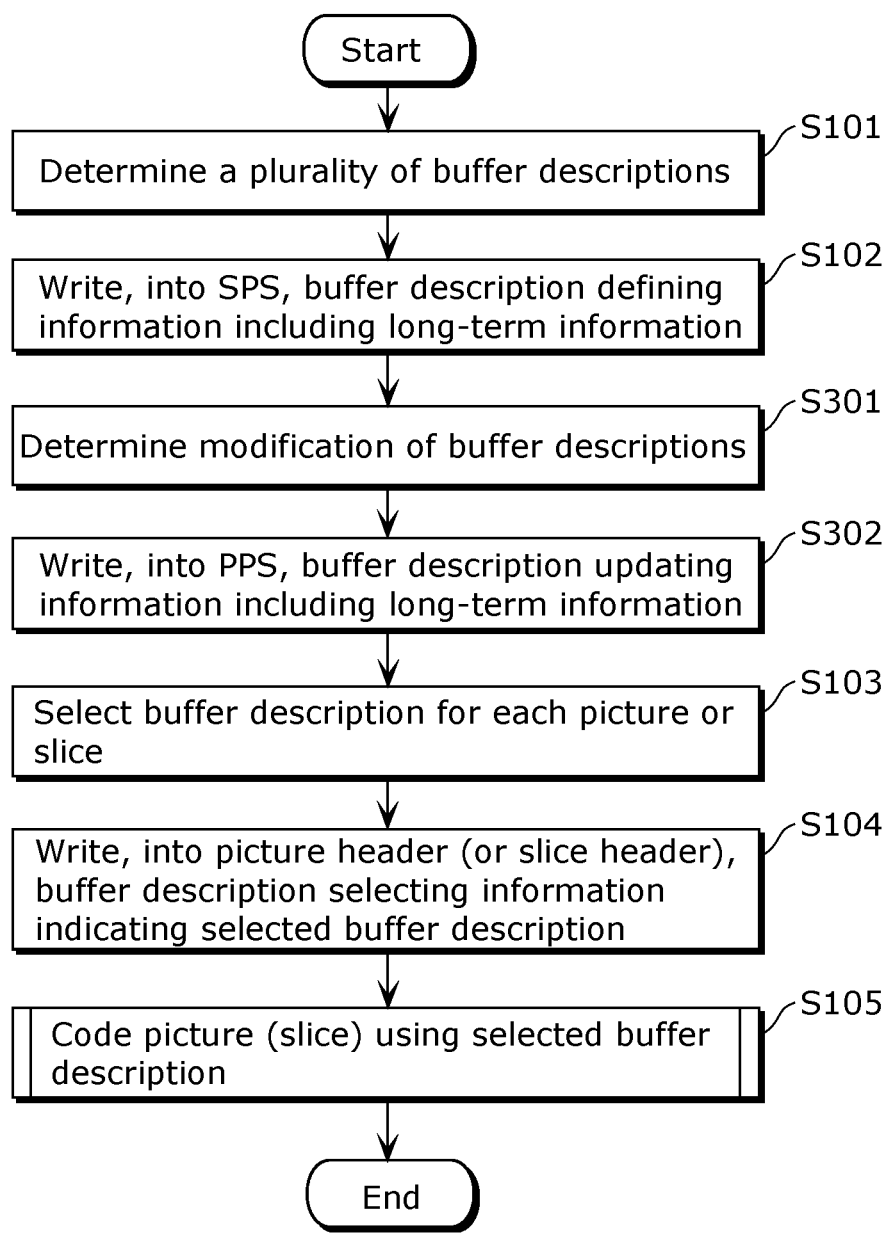
FIG. 9 is a flowchart of an image coding method according to Embodiment 2 of the present disclosure.

FIG. 9 is a flowchart of an image coding method according to this embodiment. The processing shown in FIG. 9 additionally includes Steps S301 and S302 as compared to those shown in FIG. 4 in the image coding method according to Embodiment 1.

After Step S102, the image coding apparatus 100 modifies a plurality of buffer descriptions (S301). Specifically, the image coding apparatus 100 modifies one or more buffer descriptions out of the plurality of buffer descriptions. It is to be noted that the image coding apparatus 100 may add new buffer descriptions instead of modifying the original buffer descriptions. The image coding apparatus 100 may modify some or all of the buffer descriptions. For example, the image coding apparatus 100 may modify some or all of the buffer elements included in the buffer descriptions. Furthermore, the image coding apparatus 100 determines whether or not reference pictures included in the modified buffer descriptions are to be assigned as long-term reference pictures.

Next, for modifying some buffer descriptions out of the plurality of buffer descriptions, the image coding apparatus 100 writes, into the PPS in the coded bitstream 132, buffer description updating information which indicates the details of the modification (S302). Here, the buffer description updating information includes long-term information for assigning a reference picture as a long-term reference picture.

It is to be noted that, when new buffer descriptions are determined to be created in Step S301, the buffer description updating information comprises information for defining new additional buffer descriptions.

Next, the image coding apparatus 100 selects one buffer description out of the modified plurality of buffer descriptions (S103) and writes, into the picture header of the current picture in the coded bitstream 132, buffer description selecting information which specifies the selected buffer description (S104). Finally, the image coding apparatus 100 codes the current picture or slice using the selected buffer description and the long-term information (S105).

[Syntax Diagram]

Figure 10:
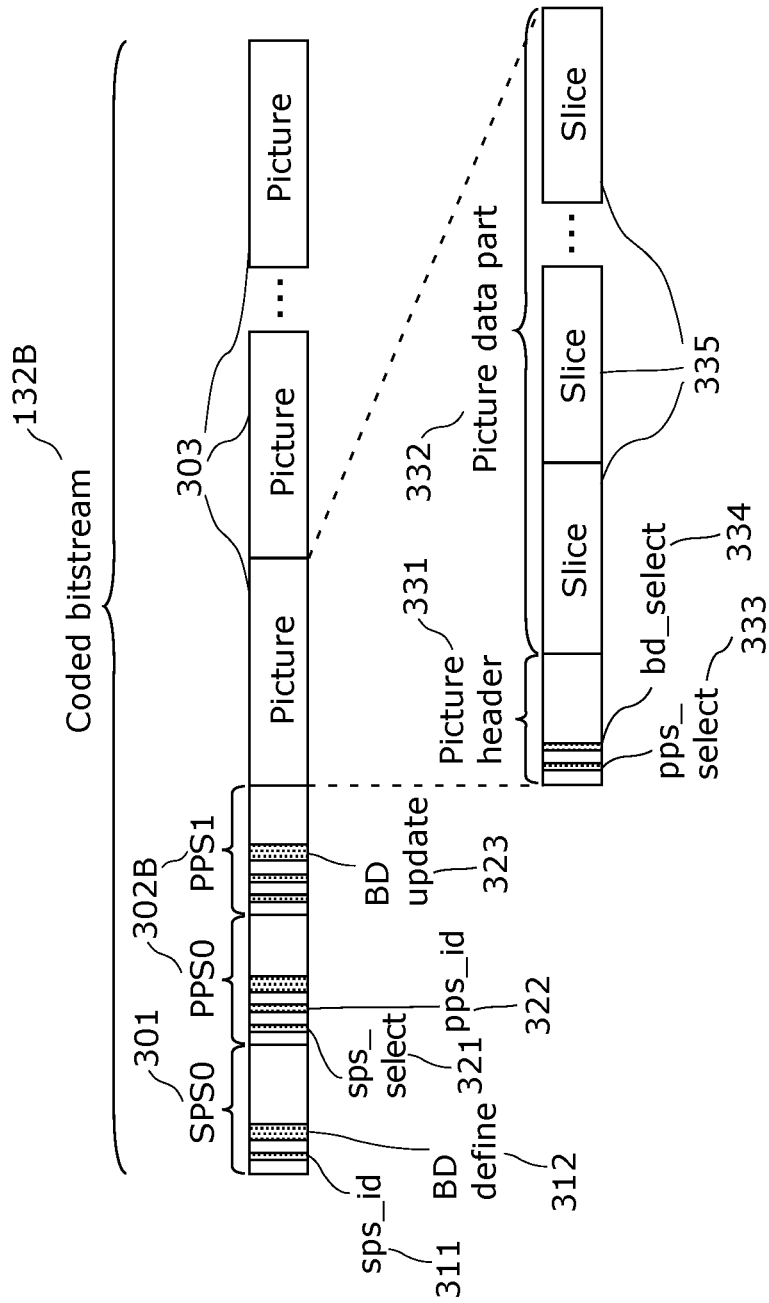
FIG. 10 shows a structure of a coded bitstream according to Embodiment 2 of the present disclosure.
Figure 11:
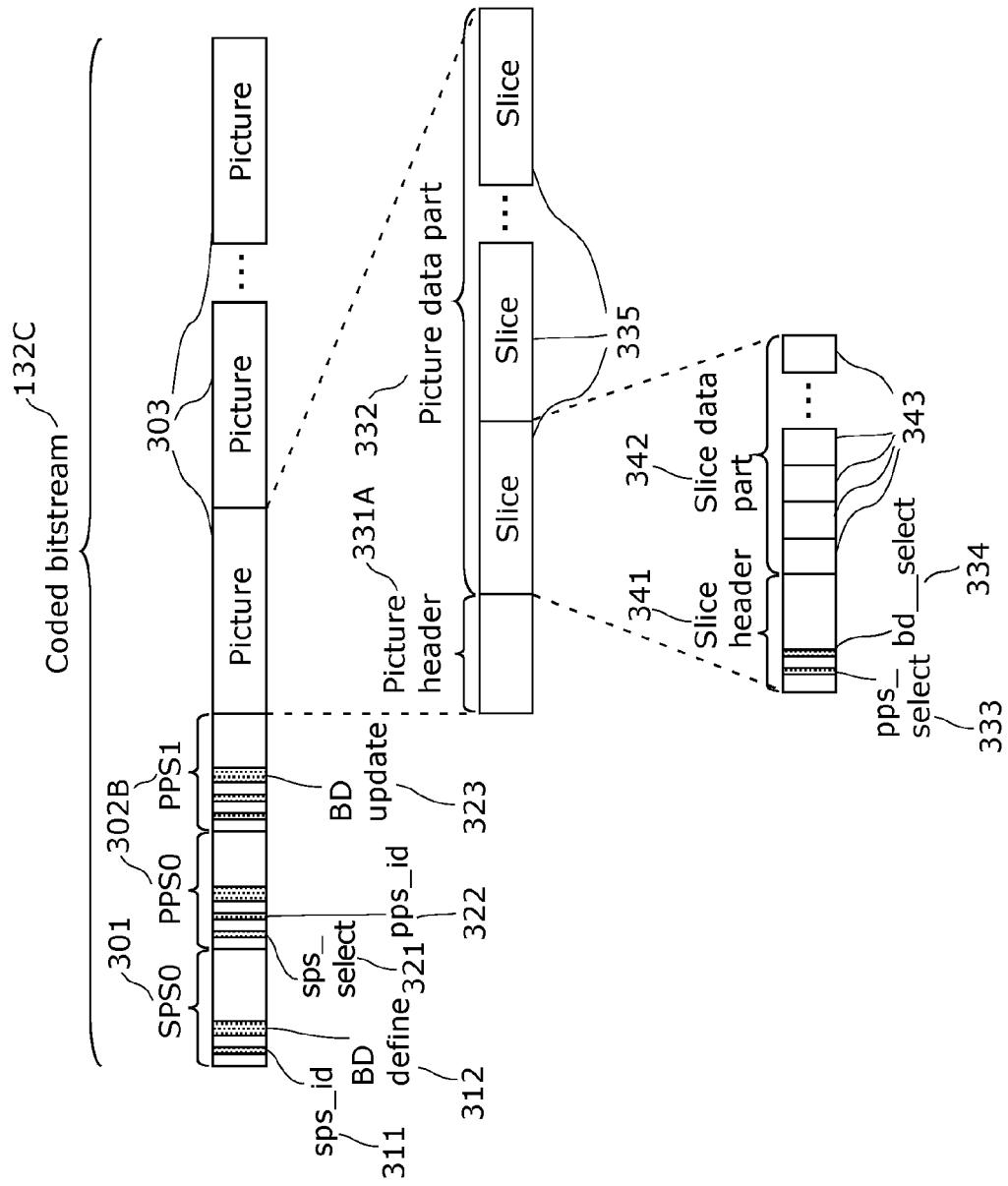
FIG. 11 shows a structure of a coded bitstream according to a variation of Embodiment 2 of the present disclosure.

FIGS. 10 and 11 are each a syntax diagram which shows the location of the buffer description updating information in a coded bitstream in this embodiment. Two exemplary syntax locations are described in the following.

A coded bitstream 132B shown in FIG. 10 is different from the coded bitstream 132 shown in FIG. 5 in that PPS 302B replaces PPS 302. Specifically, the PPS 302B further includes buffer description updating information 323 (BD update).

This buffer description updating information 323 includes: buffer description selecting information which specifies a buffer description; buffer element selecting information which specifies a buffer element; and a picture identifier. The picture identifier is included in the buffer description specified in the buffer description selecting information and specifies a picture assigned to the buffer element specified in the buffer element selecting information. It is to be noted that one buffer element corresponds to one reference picture stored in the frame buffer. It is to be noted that the buffer description updating information 323 may include a plurality of sets of the buffer description selecting information, the buffer element selecting information, and the picture identifier. In other words, the buffer description updating information 323 may include information for updating a plurality of buffer elements.

Furthermore, when the coded bitstream 132B includes a plurality of PPSs 302, the buffer description updating information 323 in one of the PPSs 302 is independent of that in another one of the PPSs 302. That is, different PPSs 302 can be associated with different buffer descriptions. For example, when the second PPS is active, the buffer description updating information 323 included in the first PPS is not used. In this case, the buffer description updating information 323 included in the active second PPS is applied to the buffer description defining information 312 included in the SPS 301.

It is to be noted that the same applies to the case where the long-term index is used. Specifically, when the second PPS is active, the long-term index included in the active first PPS is not used.

Furthermore, in the buffer description updating information 323, the method of assigning a long-term reference picture to a buffer element can be the same or like as that in the above-described case of the buffer description defining information 312. In the buffer description updating information 323, when a reference picture is indicated by the picture identifier or the long-term index, the reference picture is regarded as a long-term reference picture.

This means that the long-term information included in the buffer description updating information 323 may include a picture identifier which identifies a reference picture to be assigned as the long-term reference picture. Furthermore, the above long-term information may include a long-term index which identifies the reference picture to be assigned as the long-term reference picture. Moreover, the long-term information may further include a unique picture identifier (POC number) for specifying a reference picture associated with the long-term index.

With the foregoing, for the current picture, the PPS 302B indicated in the PPS selecting information 333 included in the picture header 331 of the current picture is referred to, and the buffer description updating information 323 included in the PPS 302B referred to is then referred to. Furthermore, the SPS301 indicated in the SPS selecting information 321 included in the PPS 302B is referred to, and the buffer description defining information 312 included in the SPS301 referred to is then referred to. When the buffer description updating information 323 referred to includes information for updating the buffer description specified in the buffer description selecting information 334 included in the above picture header 331, the buffer description updated based on such information is used in the process of coding or decoding the current picture. In contrast, when the buffer description updating information 323 referred to does not include the information for updating the buffer description specified in the buffer description selecting information 334 included in the above picture header 331, the buffer description which is included in the buffer description defining information 312 in the SPS 301 and is specified in the buffer description selecting information 334 is used in the process of coding or decoding the current picture.

In a coded bitstream 132C shown in FIG. 11, the PPS selecting information 333 and the buffer description selecting information 334 are not included in the picture header 331A, but are included in the slice header 341. Also in this case, the effects the same as those in the case shown in FIG. 10 can be obtained.

The buffer description updating information 323 may be located in signalling units other than PPS in a coded bitstream. Such other signalling units possess the same characteristics as the PPS in that they contain the parameters used in common by a plurality of slices in one or more pictures. The extension and adaptation from the PPS to these other signalling units will be apparent to those skilled in the art.

Although the above describes an example in which both the buffer description defining information 312 and the buffer description updating information 323 include the long-term information, it may also be possible that only one of the buffer description defining information 312 and the buffer description updating information 323 includes the long-term information.

[Effect of Coding Method]

With the foregoing, the image coding apparatus 100 according to this embodiment is capable of preventing redundant repetition of the same parameters for constructing the reference lists in the coded bitstream. This allows the image coding apparatus 100 to improve the coding efficiency of the parameters describing reference list construction. Furthermore, the image coding apparatus 100 is capable of achieving design harmonization of the hierarchically structured signaling units of a coded bitstream.

[Decoding Apparatus]

The block diagram of the image decoding apparatus 200 according to this embodiment is the same or alike as that shown in FIG. 7 and therefore is not explained.

[Decoding Process]

The following describes an image decoding method which is performed by the image decoding apparatus 200 according to this embodiment.

Figure 12:
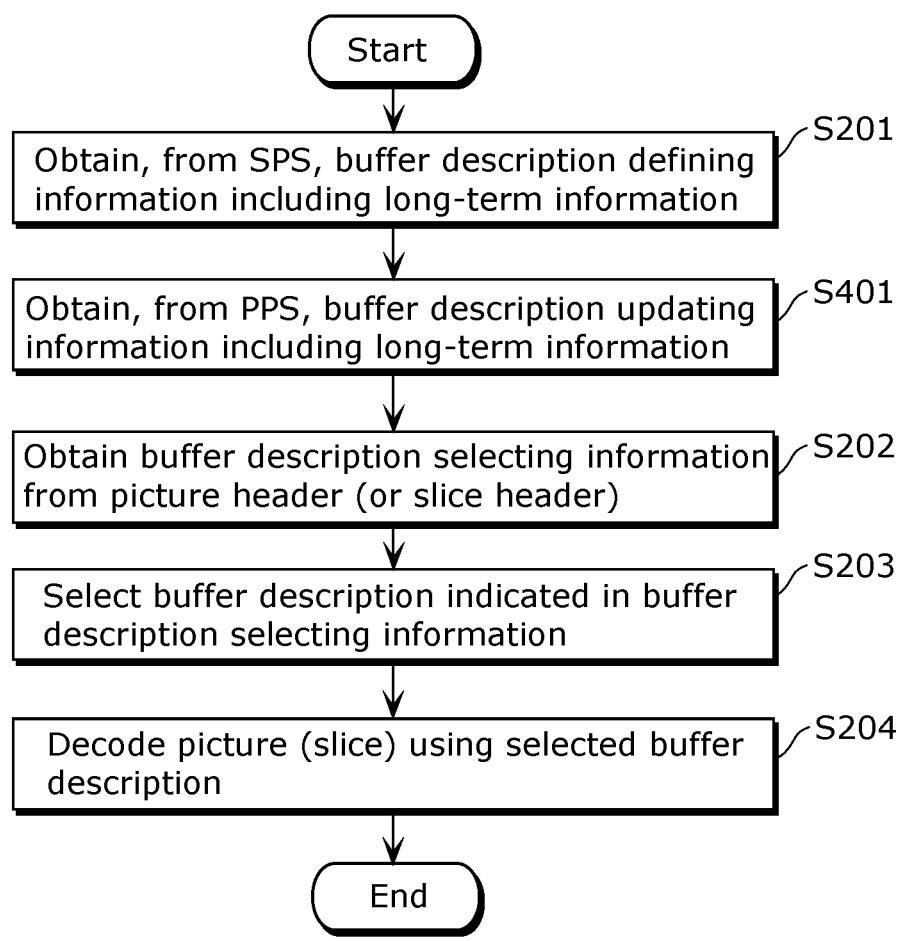
FIG. 12 is a flowchart of an image decoding method according to Embodiment 2 of the present disclosure.

FIG. 12 is a flowchart of the image decoding method according to this embodiment. The processing shown in FIG. 12 additionally includes Step S401 as compared to the steps shown in FIG. 8 in the image decoding method according to Embodiment 1.

After Step S201, the image decoding apparatus 200 obtains buffer description updating information from the PPS in the coded bitstream 232 for modifying a plurality of buffer descriptions (S401). Here, the buffer description updating information includes long-term information.

Next, the image decoding apparatus 200 obtains buffer description selecting information from the picture header of the current picture in the coded bitstream 232 for selecting one buffer description out of the modified plurality of buffer descriptions (S202). Next, the image decoding apparatus 200 selects, for the current picture (or slice), one buffer description specified in the buffer description selecting information (S203). Finally, the image decoding apparatus 200 decodes the current picture or slice using the selected buffer description and the long-term information (S204).

[Effect of Decoding Method]

With the foregoing, the image decoding apparatus 200 according to this embodiment is capable of decoding a coded bitstream which is coded in the form of improved coding efficiency and harmonized design of buffer description data.

Embodiment 3

This embodiment describes a variation of the above Embodiment 2. A coded bitstream in this embodiment is different from that in Embodiment 2 in the structure of the buffer description updating information. The following mainly describes differences from Embodiment 1 or 2 and thus omits overlapping explanations.

[Coding Apparatus]

The block diagram of the image coding apparatus 100 according to this embodiment is the same or alike as that shown in FIG. 3 and therefore is not explained.

[Coding Process]

The following describes an image coding method which is performed by the image coding apparatus 100 according to this embodiment.

Figure 13:
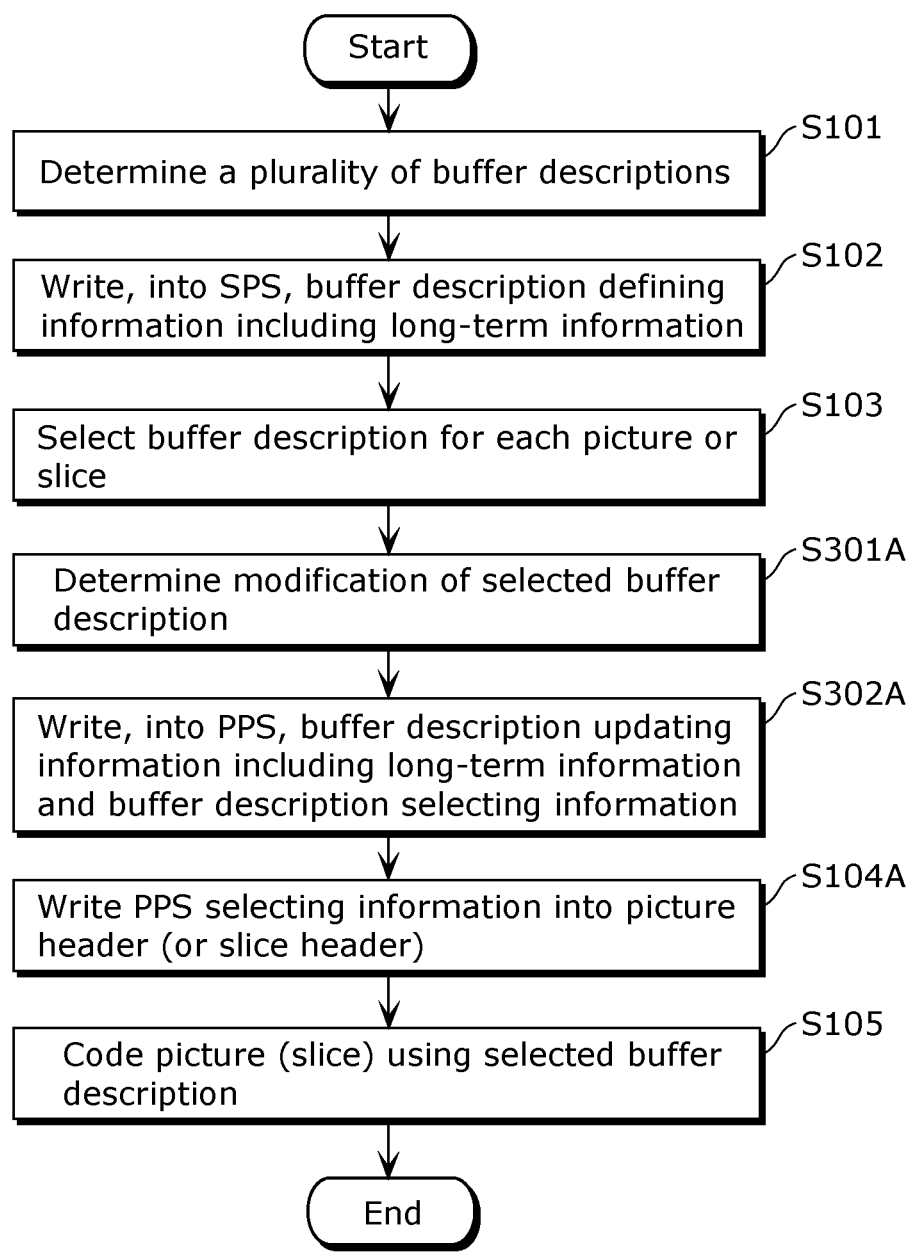
FIG. 13 is a flowchart of an image coding method according to Embodiment 3 of the present disclosure.

FIG. 13 is a flowchart of an image coding method according to this embodiment. The processing shown in FIG. 13 additionally includes Step S301A and S302A as compared to those shown in FIG. 4 in the image coding method according to Embodiment 1. Furthermore, the processing in Step S104A is different from that in Step S104.

After Step S103, the image coding apparatus 100 determines modifications for the selected buffer description (S301A). Furthermore, the image coding apparatus 100 determines whether or not a reference picture included in the modified buffer description is to be assigned as a long-term reference picture.

Next, for selecting and modifying the selected buffer description, the image coding apparatus 100 writes, into the PPS in the coded bitstream 132, buffer description updating information which indicates the details of the modification (5302A). Here, the buffer description updating information includes long-term information for assigning a reference picture as a long-term reference picture.

It is to be noted that the structure of the buffer description updating information is almost the same as that in the above Embodiment 2, for example, but, in this embodiment, the buffer description updating information includes only one set of the buffer description selecting information, the buffer element selecting information, and the picture identifier.

Next, the image coding apparatus 100 writes PPS selecting information into a picture header of a current picture (or a slice header of a current slice) in the coded bitstream 132 for indicating that the above PPS is referred to by the picture (S104A). One corresponding buffer description is thereby referred. Finally, the image coding apparatus 100 codes the current picture or slice using the selected buffer description and the long-term information (S105).

[Syntax Diagram]

Figure 14:
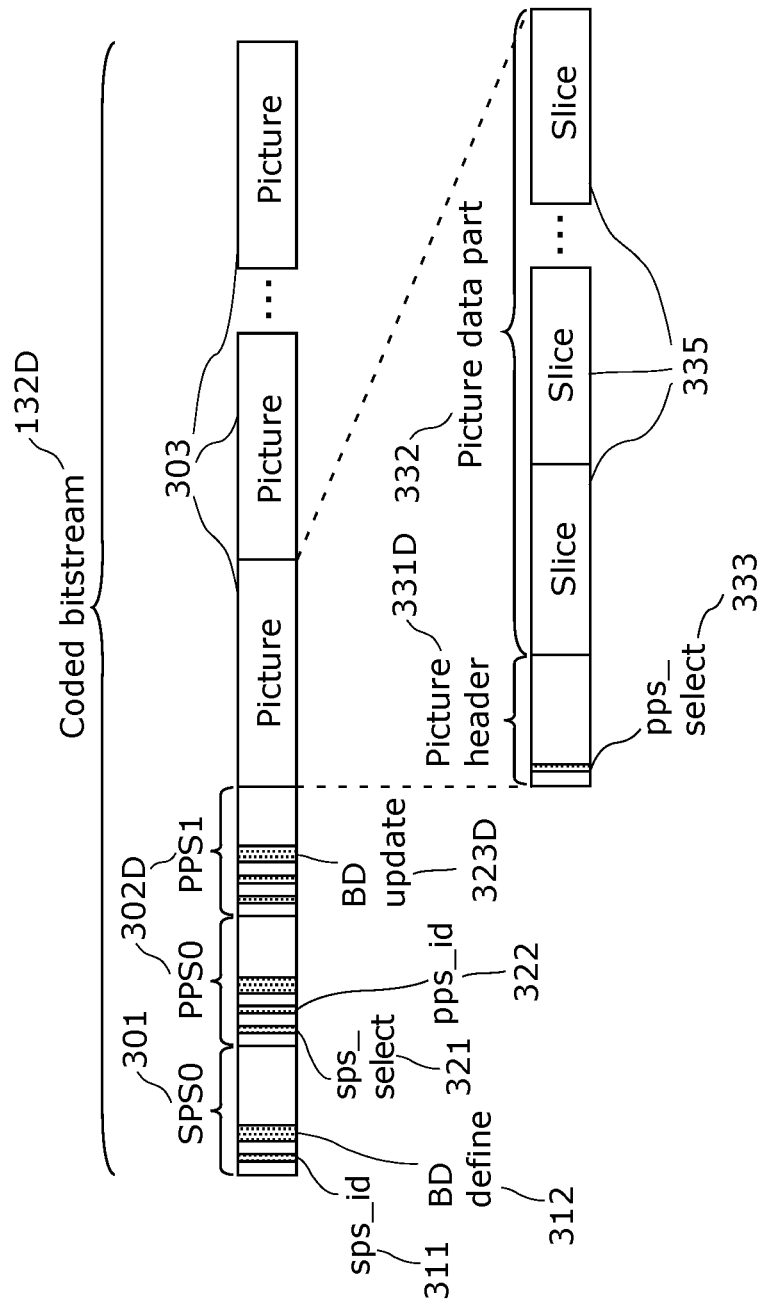
FIG. 14 shows a structure of a coded bitstream according to Embodiment 3 of the present disclosure.
Figure 15:
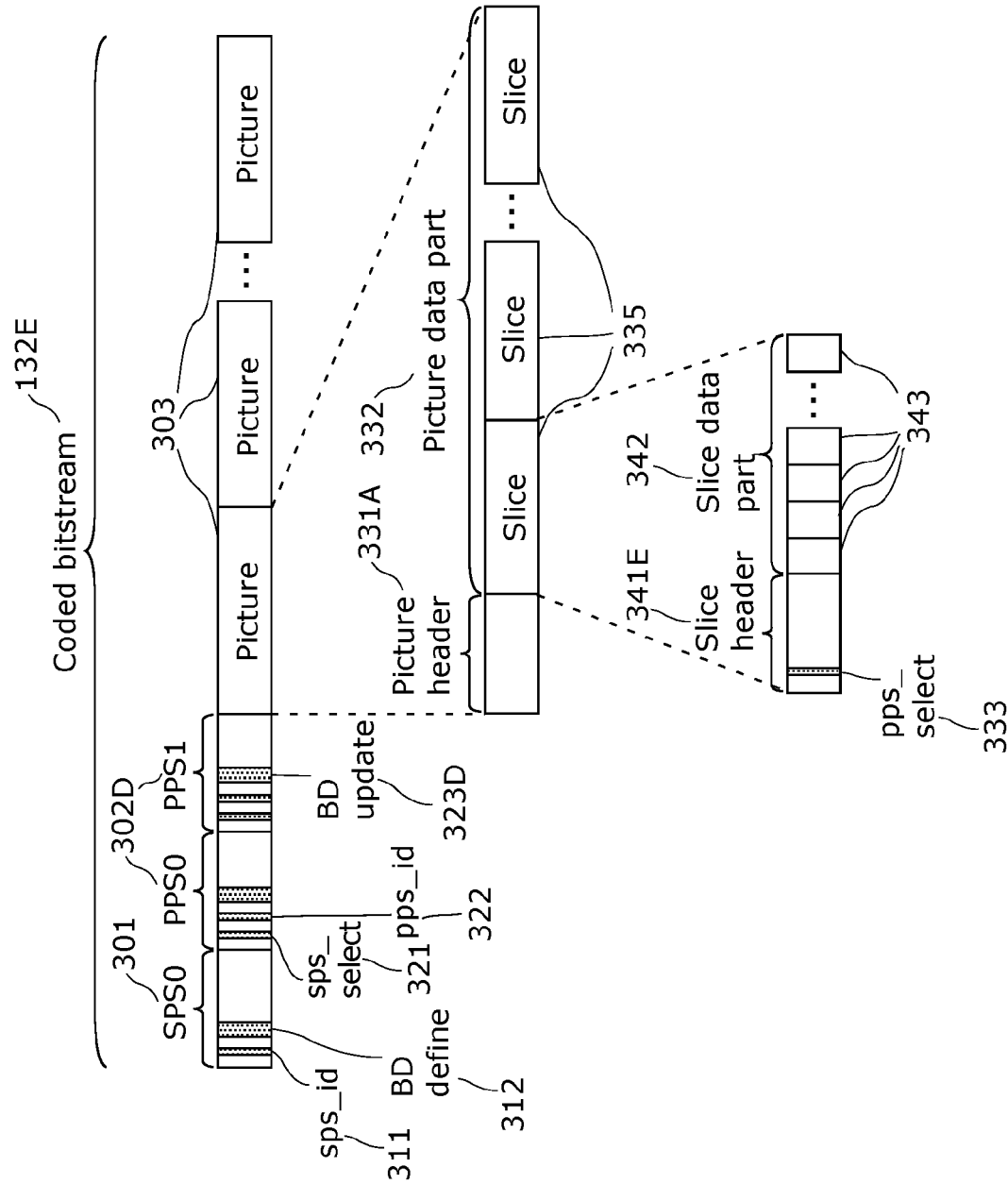
FIG. 15 shows a structure of a coded bitstream according to a variation of Embodiment 3 of the present disclosure.

FIGS. 14 and 15 are each a syntax diagram which shows the location of the buffer description updating information in a coded bitstream in this embodiment. Two exemplary syntax locations are described in the following.

A coded bitstream 132D shown in FIG. 14 is different from the coded bitstream 132B shown in FIG. 10 in that buffer description updating information 323D in PPS 302D replaces the buffer description updating information 323 in the PPS 302B. Furthermore, a picture header 331D is different from the picture header 331.

Although the structure of the buffer description updating information 323D is almost the same as that of the buffer description updating information 323, for example, the buffer description updating information 323D includes only one set of the buffer description selecting information, the buffer element selecting information, and the picture identifier.

It is to be noted that the picture header 331D does not include the buffer description selecting information 334.

With the foregoing, for the current picture, the PPS 302D indicated in the PPS selecting information 333 included in the picture header 331D of the current picture is referred to, and the buffer description updating information 323D included in the PPS 302D referred to is then referred to. Subsequently, the buffer description updating information 323D referred to is used in the process of coding or decoding the current picture. This means that the pictures or slices which refer to the same PPS 302D are coded and decoded using one updated buffer description indicated in the same buffer description updating information 323D.

In a coded bitstream 132E shown in FIG. 15, the PPS selecting information 333 is not included in the picture header 331A, but is included in a slice header 341E. Also in this case, the effects the same as those in the case shown in FIG. 14 can be obtained.

It is to be noted that the buffer description updating information 323D may be located in signalling units other than the PPS in a coded bitstream.

[Effect of Coding Method]

With the foregoing, the image coding apparatus 100 according to this embodiment is capable of preventing redundant repetition of the same parameters for constructing the reference lists in the coded bitstream. This allows the image coding apparatus 100 to improve the coding efficiency of the parameters describing reference list construction. Furthermore, the image coding apparatus 100 is capable of achieving design harmonization of the hierarchically structured signaling units of a coded bitstream.

[Decoding Apparatus]

The block diagram of the image decoding apparatus 200 according to this embodiment is the same or alike as that shown in FIG. 7 and therefore is not explained.

[Decoding Process]

The following describes an image decoding method which is performed by the image decoding apparatus 200 according to this embodiment.

Figure 16:
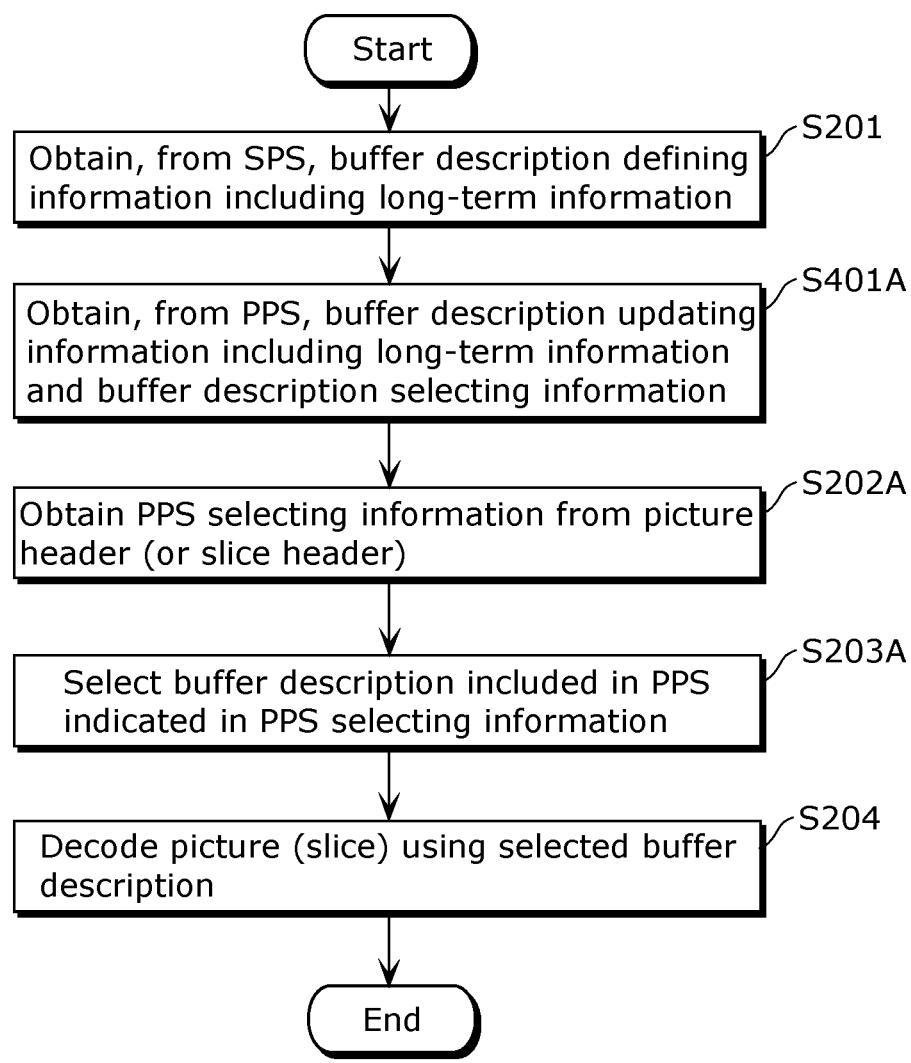
FIG. 16 is a flowchart of an image decoding method according to Embodiment 3 of the present disclosure.

FIG. 16 is a flowchart of the image decoding method according to this embodiment. The processing shown in FIG. 16 additionally includes Step S401A as compared to the steps shown in FIG. 8 in the image decoding method according to Embodiment 1. Furthermore, the processing in Steps S202A and S203A is different from that in Steps S202 and S203.

After Step S201, the image decoding apparatus 200 obtains, from the PPS in the coded bitstream, buffer description updating information including long-term information and buffer description selecting information, for selecting and modifying one buffer description out of the plurality of buffer descriptions (S401A).

Next, the image decoding apparatus 200 obtains, from the picture header of the current picture in the coded bitstream, a PPS identifier for indicating that the above PPS is referred to by the current picture (S202A). Next, the image decoding apparatus 200 selects, for the current picture (or slice), one buffer description specified in the buffer description selecting information in the PPS specified by the PPS identifier (S203A). Finally, the image decoding apparatus 200 decodes the current picture or slice using the selected buffer description and the long-term information (S204).

[Effect of Decoding Method]

With the foregoing, the image decoding apparatus 200 according to this embodiment is capable of decoding a coded bitstream which is coded in the form of improved coding efficiency and harmonized design of buffer description data.

Embodiment 4

This embodiment describes a variation of the above Embodiment 3. In this embodiment, the buffer description updating information is included in the slice header. The following mainly describes differences from Embodiment 1, 2, or 3 and thus omits overlapping explanations.

[Coding Apparatus]

The block diagram of the image decoding apparatus 100 according to this embodiment is the same or alike as that shown in FIG. 3 and therefore is not explained.

[Coding Process]

The following describes an image coding method which is performed by the image coding apparatus 100 according to this embodiment.

Figure 17:
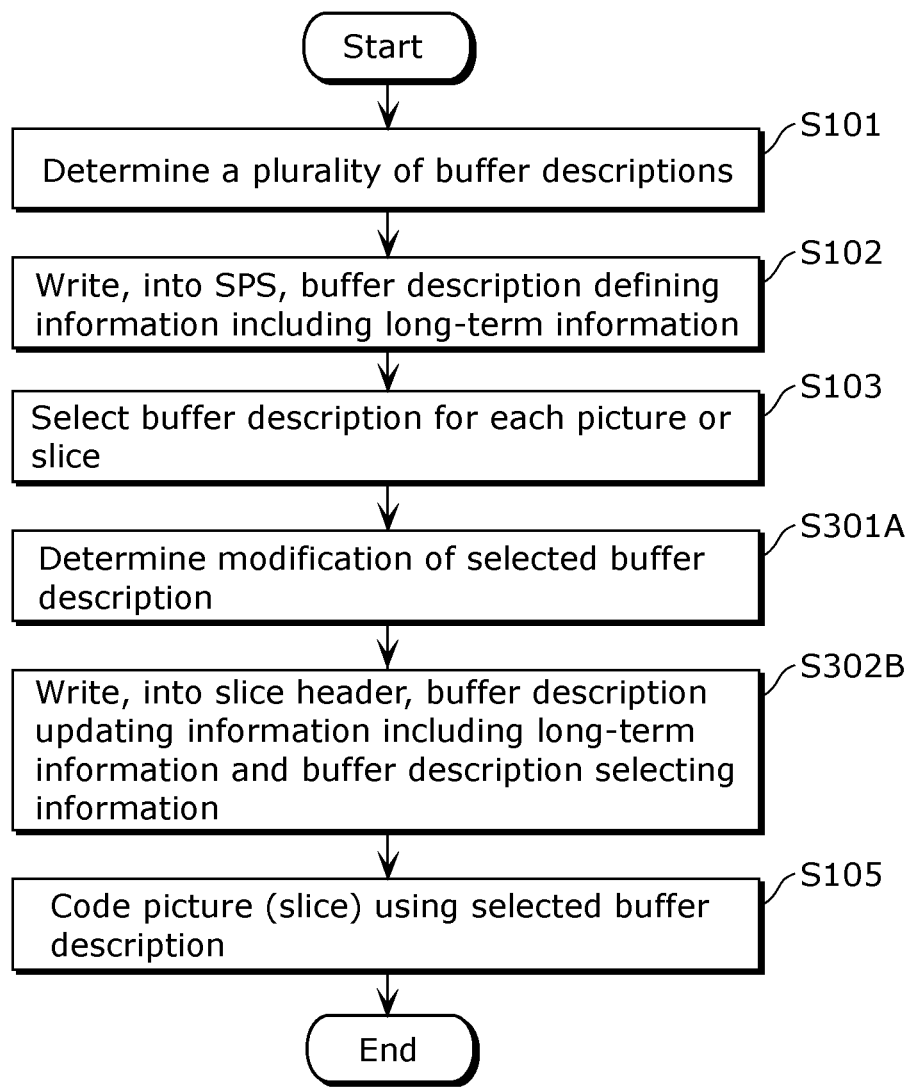
FIG. 17 is a flowchart of an image coding method according to Embodiment 4 of the present disclosure.

FIG. 17 is a flowchart of the image decoding method according to this embodiment. The processing shown in FIG. 17 includes Step S302B instead of Steps S302A and S104A shown in FIG. 13 in the image coding method according to Embodiment 3.

After Step S301A, for modifying the selected buffer description, the image coding apparatus 100 writes, into the slice header of the current slice in the coded bitstream, buffer description updating information including buffer description selecting information which specifies the selected buffer description (S302B). Here, the buffer description updating information includes long-term information.

It is to be noted that the structure of the buffer description updating information is the same or alike as that in the above Embodiment 3, for example.

Finally, the image coding apparatus 100 codes the current slice using the selected buffer description and the long-term information (S105).

[Syntax Diagram]

Figure 18:
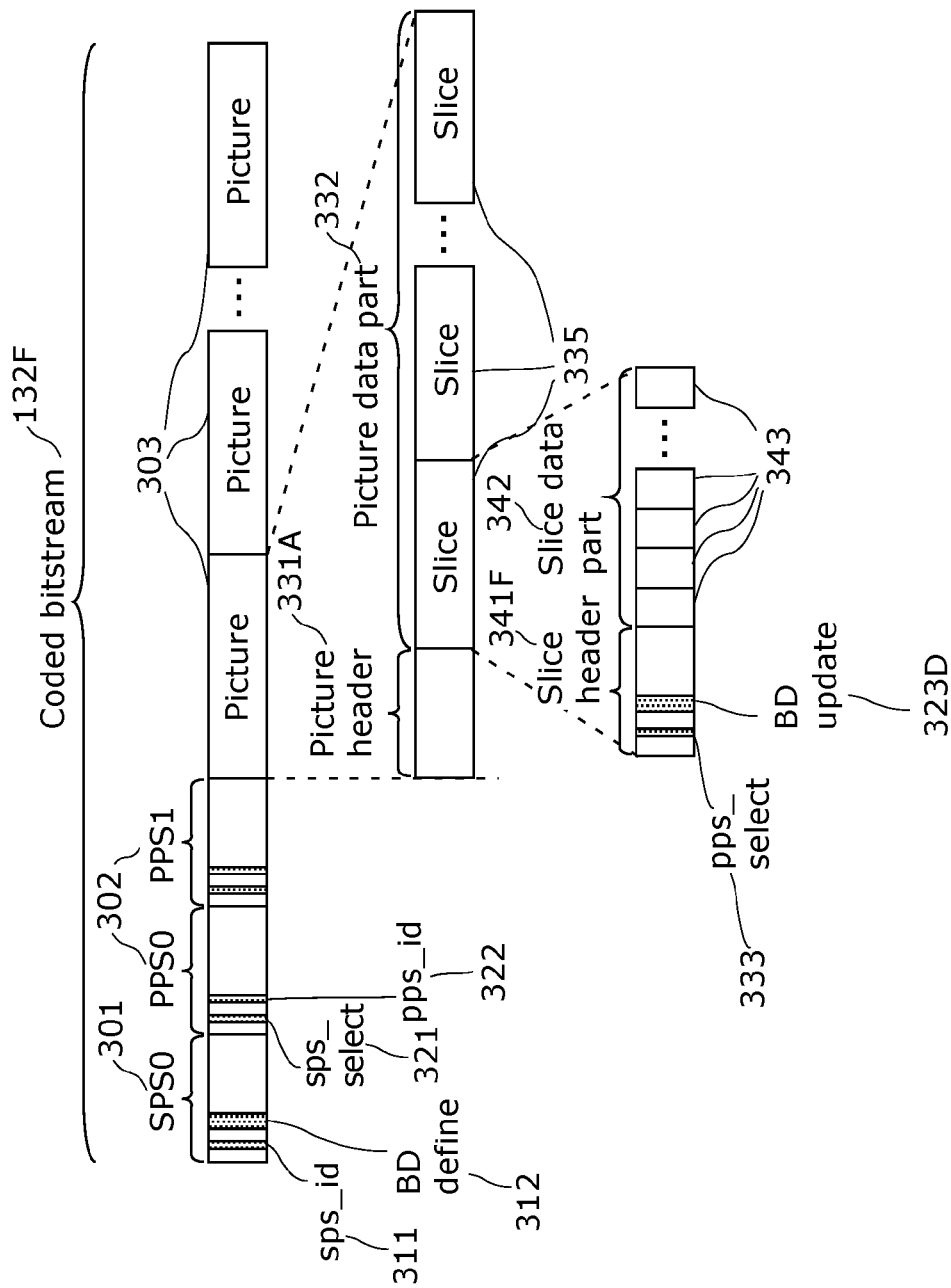
FIG. 18 shows a structure of a coded bitstream according to Embodiment 4 of the present disclosure.

FIG. 18 is a syntax diagram which shows the location of the buffer description updating information in a coded bitstream in this embodiment.

A coded bitstream 132F shown in FIG. 18 is different from the coded bitstream 132E shown in FIG. 15 in that the buffer description updating information 323D is included not in the PPS 302D, but in the slice header 341E.

With the foregoing, for the current slice, the buffer description updating information 323D included in the slice header 341F of the current slice is referred to. Subsequently, the buffer description updating information 323D referred to is used in the process of coding or decoding the current picture.

Here, the buffer description updating information 323D in one slice header 341F is independent of that in another slice header 341F. In other words, the updating process indicated in the buffer description updating information 323D included in one slice header 341F is applied only to that slice and is not applied to another slice. In addition, the buffer description updating information 323D included in an active slice header 341F is applied to the buffer description defining information 312 included in the SPS 301.

Figure 19:
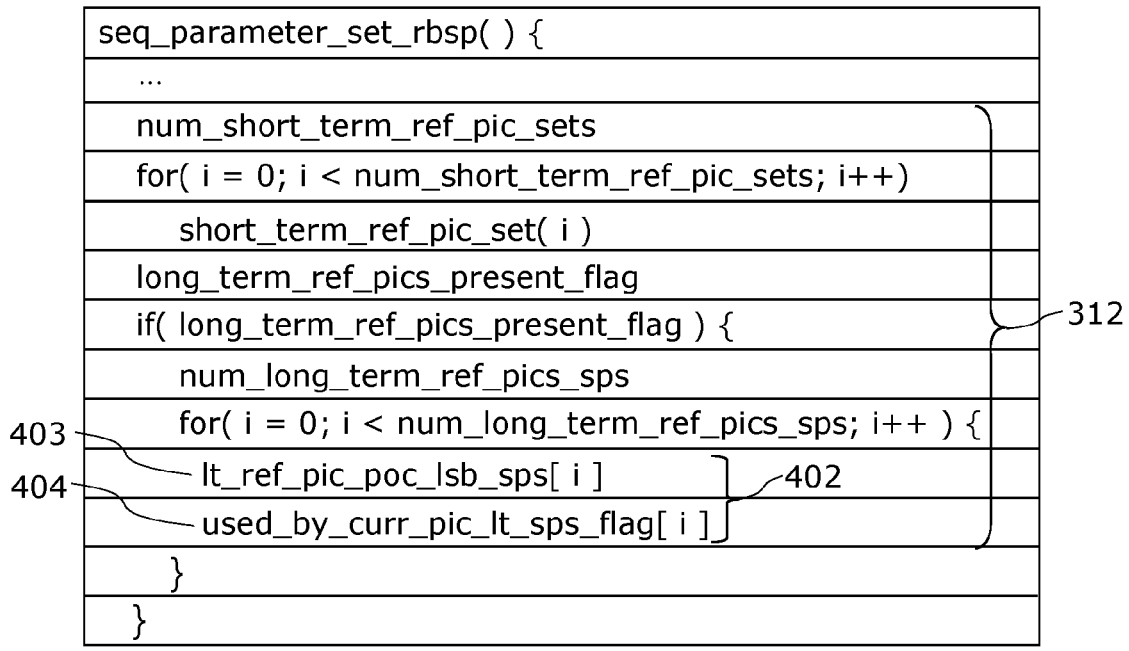
FIG. 19 shows a syntax structure of a sequence parameter set according to Embodiment 4 of the present disclosure.

The following describes the syntax structure of the SPS 301 and the slice header 341F according to this embodiment. FIG. 19 shows the syntax structure of the SPS 301 according to this embodiment. FIG. 20 shows the syntax structure of the slice header according to this embodiment.

As shown in FIG. 19, the SPS 301 includes the buffer description defining information 312. The buffer description defining information 312 includes long-term information 402 for assigning, as a long-term reference picture, a reference picture indicated by one or more buffer elements included in one or more buffer descriptions. This long-term information 402 includes a picture identifier 403 (such as a POC number) and a long-term index 404.

As shown in FIG. 20, the slice header 341F (or sub-picture unit) includes the buffer description updating information 323D. The buffer description updating information 323D is information for selecting one of the buffer descriptions and updating the selected buffer description. This buffer description updating information 323D includes the buffer description selecting information 334 and long-term information 405 for assigning, as a long-term reference picture, a reference picture indicated by one or more buffer elements included in one or more buffer descriptions. This long-term information 405 includes a long-term index 406 and a picture identifier 407 (POC number).

It is to be noted that either only one or both of the picture identifier 407 and the long-term index 406 which are included in the slice header 341F may be used for assigning a long-term reference picture to a buffer element. Likewise, either only one or both of the picture identifier 403 and the long-term index 404 which are included in the SPS 301 may be used for assigning a long-term reference picture to a buffer element.

It is to be noted that the same or like syntax structure may be used also in the other embodiments described above. For example, also in the above Embodiment 1, the syntax structure of SPS shown in FIG. 19 may be used. Furthermore, in Embodiment 1, the slice header 341 includes the buffer description selecting information 334 (short_term_ref_pic_set_idx).

[Effect of Coding Method]

With the foregoing, the image coding apparatus 100 according to this embodiment is capable of preventing redundant repetition of the same parameters for constructing the reference lists in the coded bitstream. This allows the image coding apparatus 100 to improve the coding efficiency of the parameters describing reference list construction. Furthermore, the image coding apparatus 100 is capable of achieving design harmonization of the hierarchically structured signaling units of a coded bitstream.

[Decoding Apparatus]

The block diagram of the image decoding apparatus 200 according to this embodiment is the same or alike as that shown in FIG. 7 and therefore is not explained.

[Decoding Process]

The following describes an image decoding method which is performed by the image decoding apparatus 200 according to this embodiment.

Figure 21:
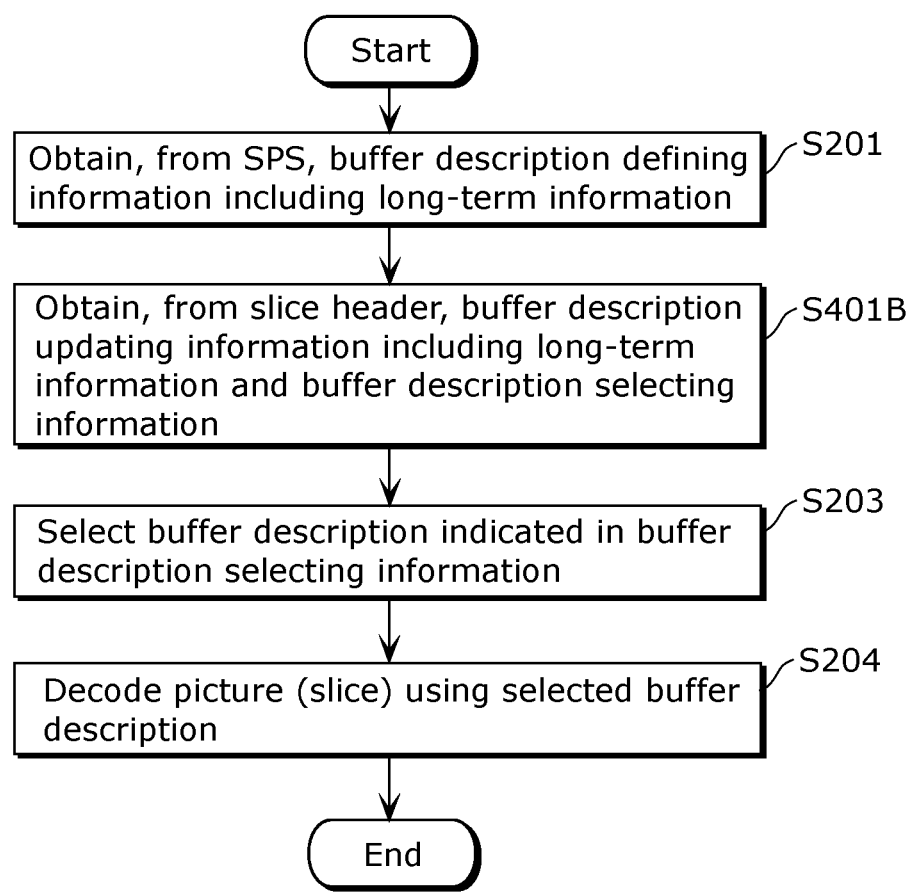
FIG. 21 is a flowchart of an image decoding method according to Embodiment 4 of the present disclosure.

FIG. 21 is a flowchart of the image decoding method according to this embodiment. The processing shown in FIG. 21 includes Step S401B instead of Step S202 shown in FIG. 8 in the image decoding method according to Embodiment 1.

After Step S201, the image decoding apparatus 200 obtains, from the slice header of the current slice in the coded bitstream, buffer description updating information including buffer description selecting information, for selecting and modifying one buffer description out of the plurality of buffer descriptions (S401B). Here, the buffer description updating information includes long-term information.

Next, the image decoding apparatus 200 selects the buffer description specified in the buffer description selecting information (S203). Finally, the image decoding apparatus 200 decodes the current slice using the selected buffer description and the long-term information (S204).

[Effect of Decoding Method]

With the foregoing, the image decoding apparatus 200 according to this embodiment is capable of decoding a coded bitstream which is coded in the form of improved coding efficiency and harmonized design of buffer description data.

As above, in the image coding method according to this embodiment, the buffer description defining information which defines a plurality of buffer descriptions is written into the SPS corresponding to the coded bitstream.

Furthermore, in the image coding method, for each processing unit that is a picture or a slice, one of the buffer descriptions is selected, and buffer description selecting information which specifies the selected buffer description is written into a first header of the processing unit which is included in the coded bitstream. Here, the first header is a header of a picture or a slice and specifically is PPS, a picture header, or a slice header.

In the image coding method, the processing unit is coded using the selected buffer description.

Furthermore, the above buffer description defining information includes long-term information for assigning a reference picture as a long-term reference picture.

As above, in the image coding method, the buffer description defining information including the long-term information is written into the sequence parameter set shared by a plurality of pictures, and a buffer description identifier indicating a buffer description to be selected is written into a header of each picture or slice. This allows a reduction in redundant information and thereby allows an improvement in coding efficiency in the image coding method as compared to the case where the buffer description defining information is written into a picture parameter set. Furthermore, in the image coding method, it is possible to reduce redundant information and therefore possible to improve the coding efficiency as compared to the case where the long-term information is written into a slice header.

Although the image coding apparatus and the image decoding apparatus according to the embodiments of the present disclosure have been described above, the present disclosure is not limited these embodiments.

For example, although the above describes an example in which the SPS is included in the coded bitstream which includes slice data and the like, the SPS may be transmitted from the image coding apparatus to the image decoding apparatus separately from the coded bitstream which includes the slice data and the like.

Respective processing units included in the image coding apparatus and the image decoding apparatus according to each of the above embodiments are typically implemented as a large scale integration (LSI) that is an integrated circuit. These processing units may be each provided on a single chip, and part or all of them may be formed into a single chip.

Moreover, ways to achieve integration are not limited to the LSI, and a special circuit or a general purpose processor can also achieve the integration. Field Programmable Gate Array (FPGA) that can be programmed after manufacturing LSIs, or a reconfigurable processor that allows re-configuration of the connection or configuration of an LSI can be used for the same purpose.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory.

Furthermore, the present disclosure may be implemented as the above software program and may also be implemented as a non-transitory computer-readable recording medium on which such a program is recorded. In addition, it goes without saying that such a program may be distributed via a communication network such as the Internet.

The numerals herein are all given to specifically illustrate the present disclosure and therefore do not limit it.

The segmentation of the functional blocks in each block diagram is an example, and some of the functional blocks may be implemented as one functional block while one functional block may be divided into plural parts, or part of the function of one functional block may be shifted to another functional block. Furthermore, the functions of a plurality of functional blocks which have similar functions may be processed in parallel or in time-sliced fashion by single hardware or software.

The processing order of the steps included in the above image coding or decoding method is given to specifically illustrate the inventive concept and therefore may be any other order. Part of the above steps may be performed at the same time as (in parallel with) another step.

Embodiment 5

The processing described in each of embodiments can be simply implemented in an independent computer system, by recording, in a recording medium, a program for implementing the configurations of the moving picture coding method and the moving picture decoding method described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method and the moving picture decoding method described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 22:
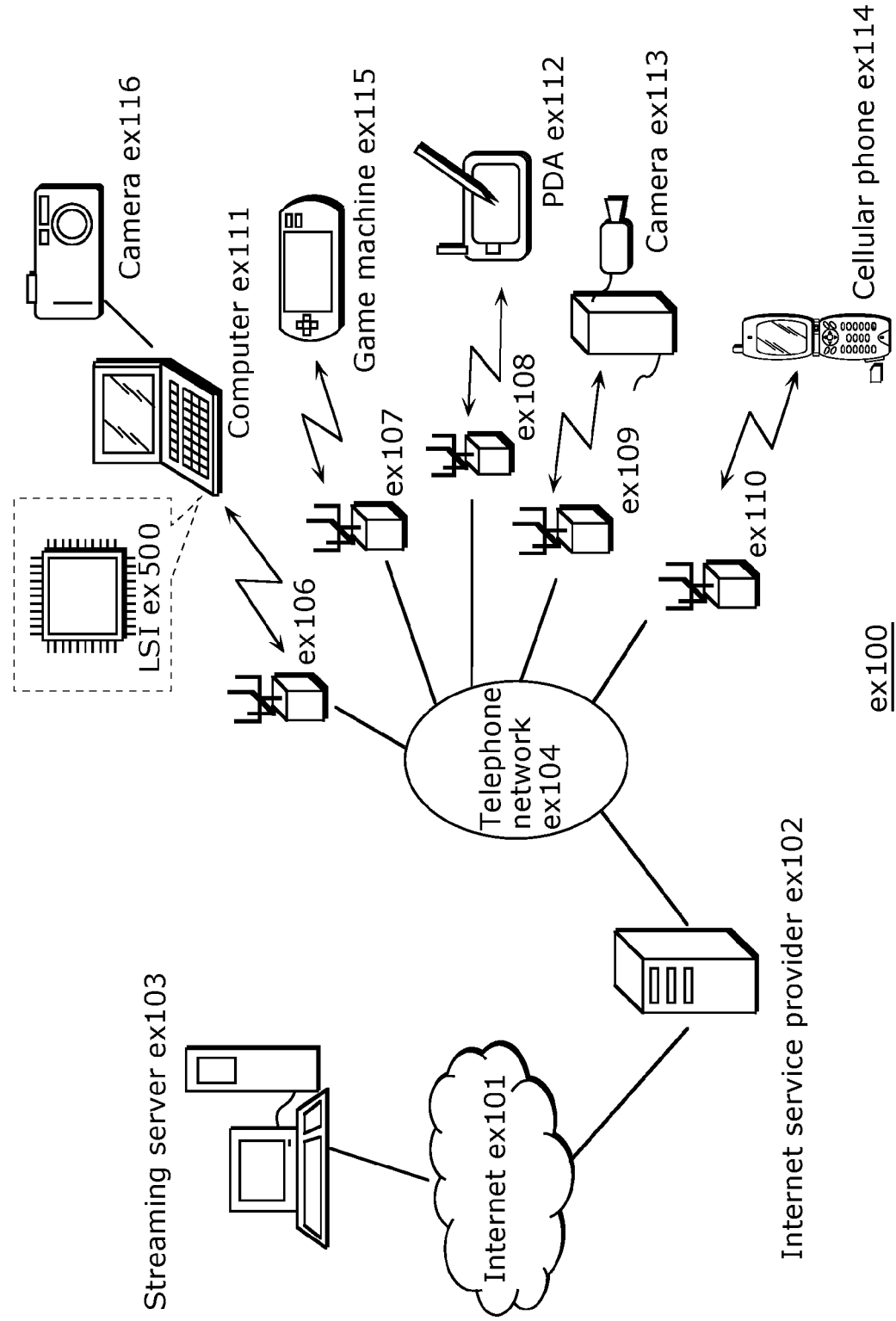
FIG. 22 shows an overall configuration of a content providing system for implementing content distribution services.

FIG. 22 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 22, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long-term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software.

Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 23:
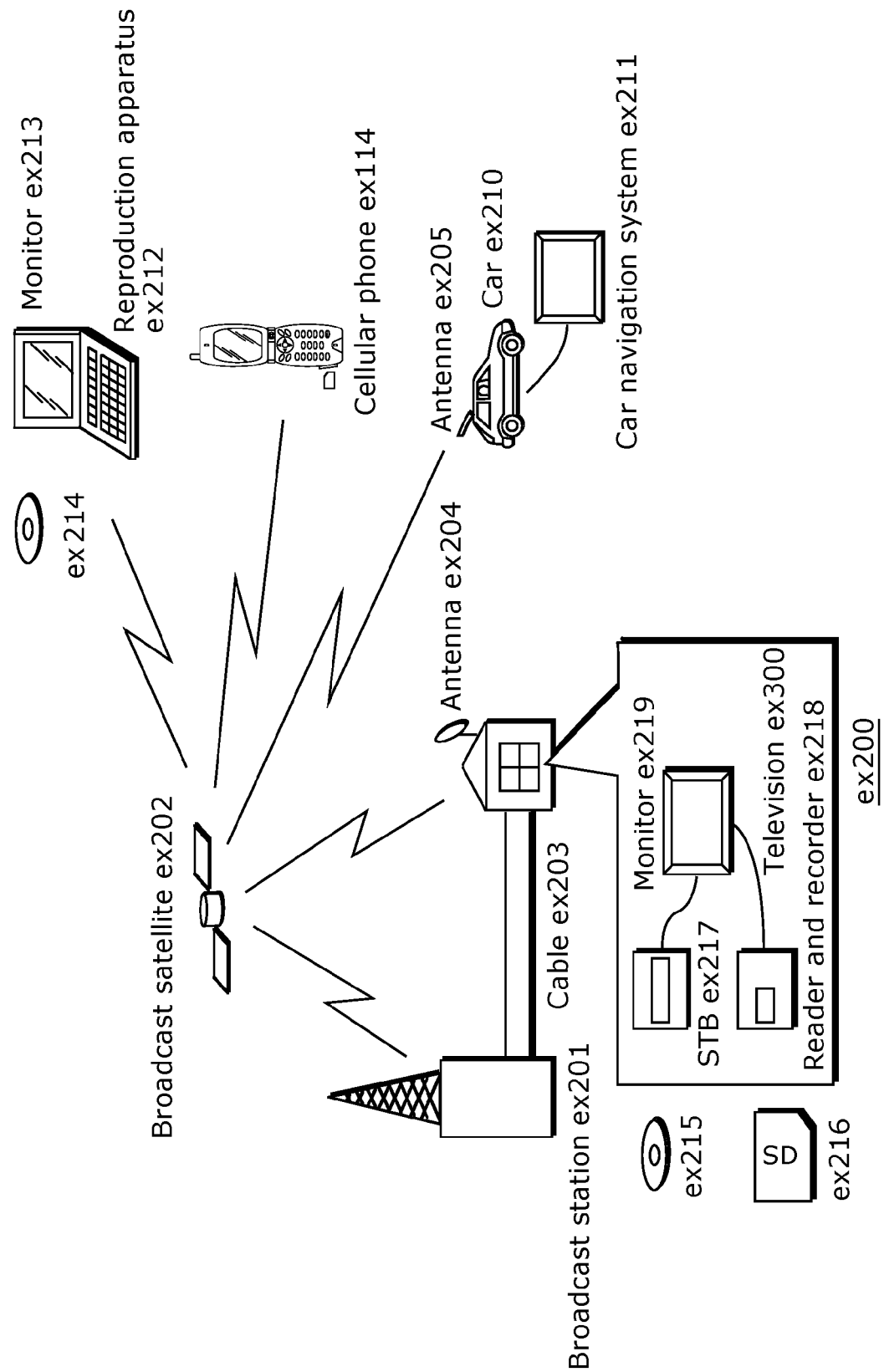
FIG. 23 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 23. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (ii) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 24:
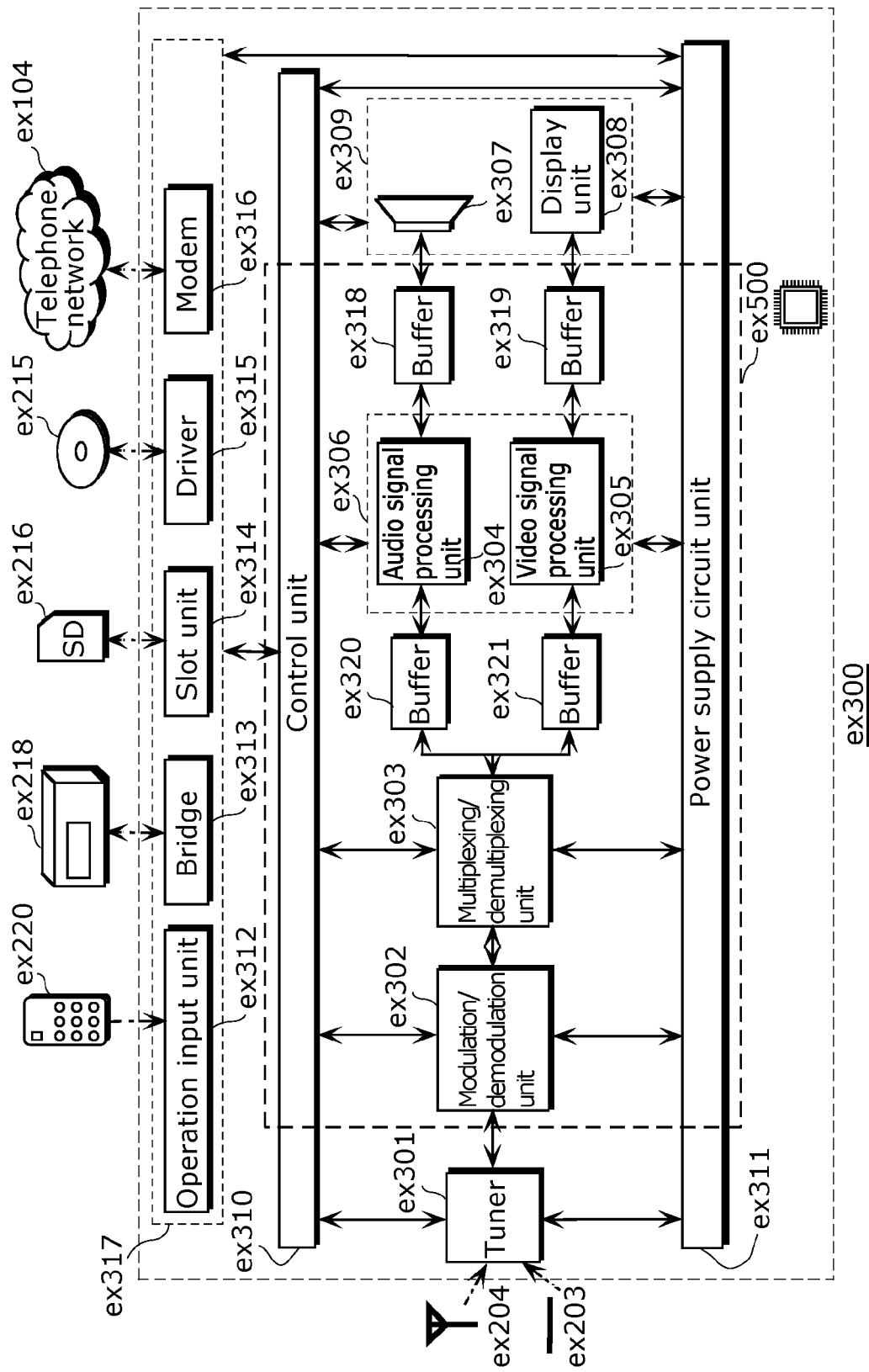
FIG. 24 shows a block diagram illustrating an example of a configuration of a television.

FIG. 24 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 25:
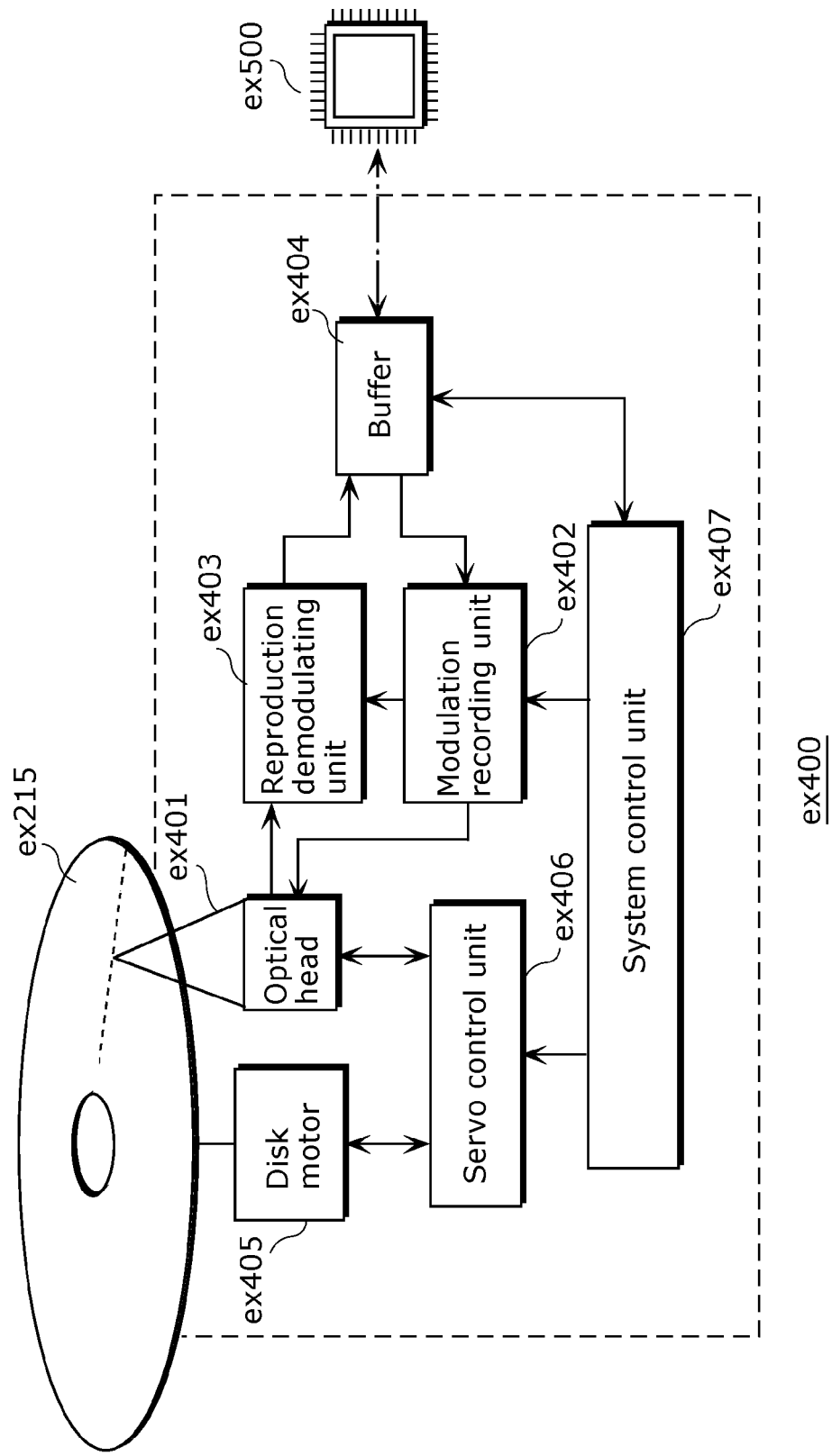
FIG. 25 shows a block diagram illustrating an example of a configuration of an information reproducing/recording unit that reads and writes information from and on a recording medium that is an optical disk.

As an example, FIG. 25 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 26:
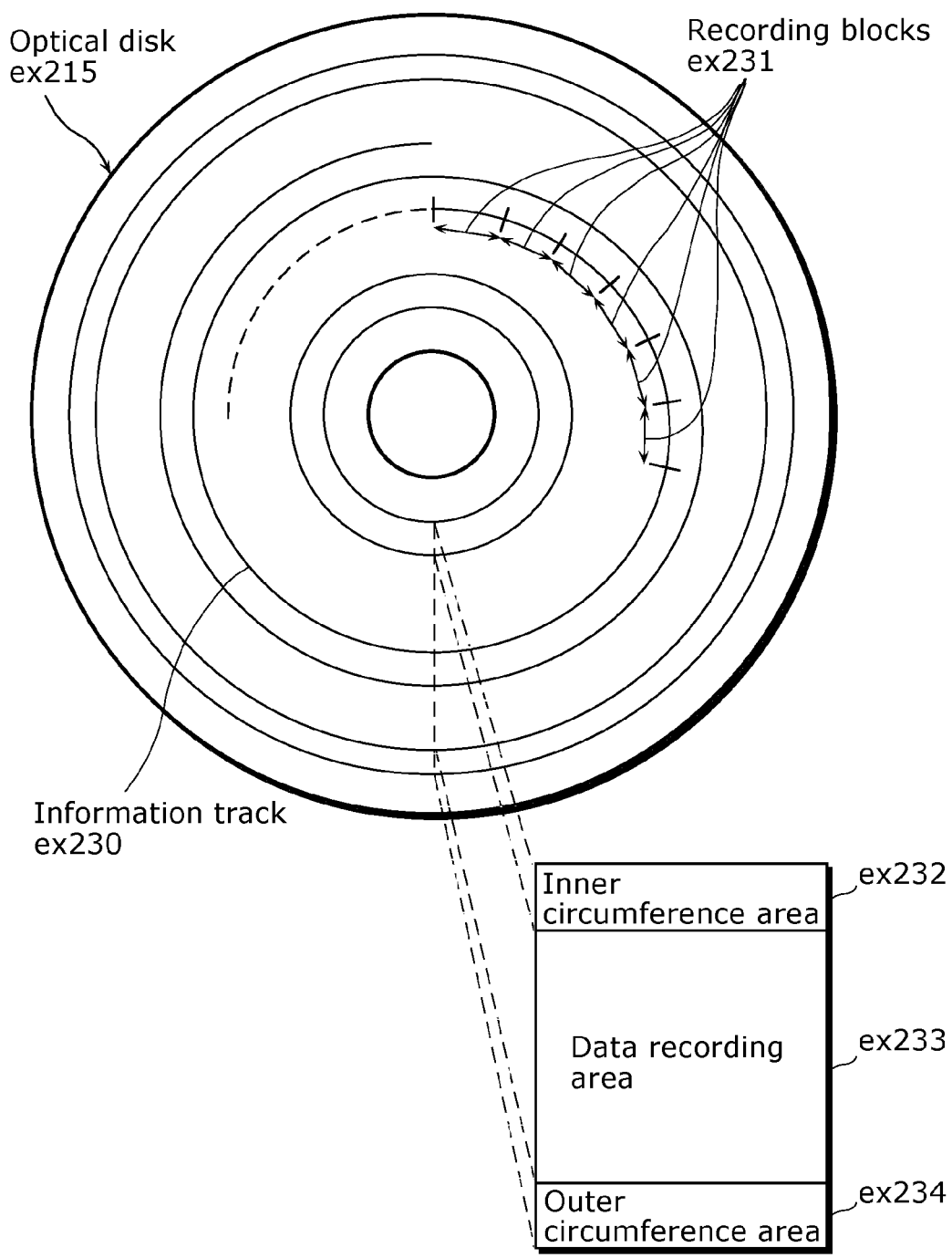
FIG. 26 shows an example of a configuration of a recording medium that is an optical disk.

FIG. 26 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 24. The same will be true for the configuration of the computer ex111, the cellular phone ex114, and others.

Figure 27A:
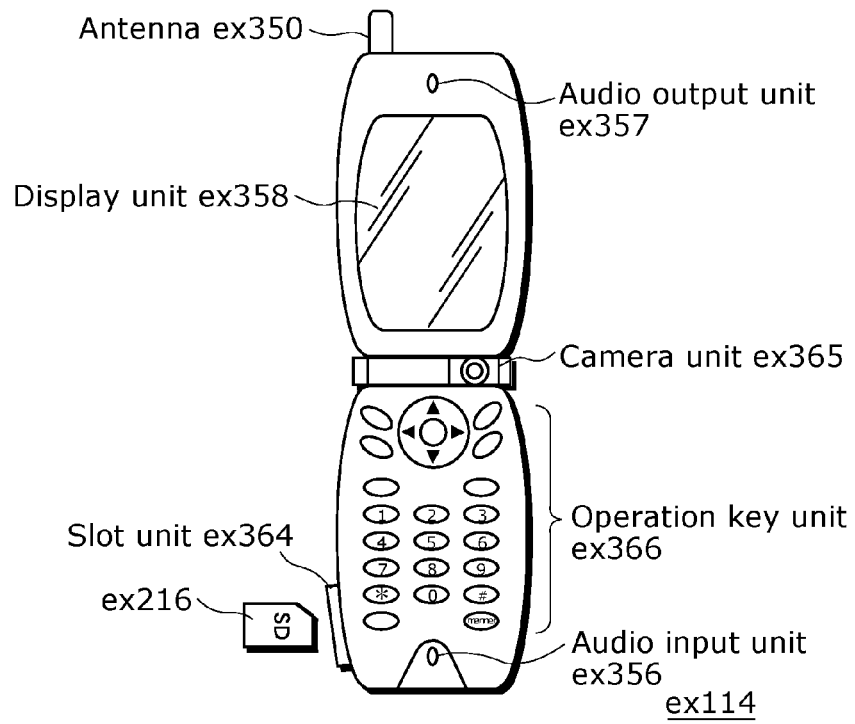
FIG. 27A shows an example of a cellular phone.

FIG. 27A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 27B:
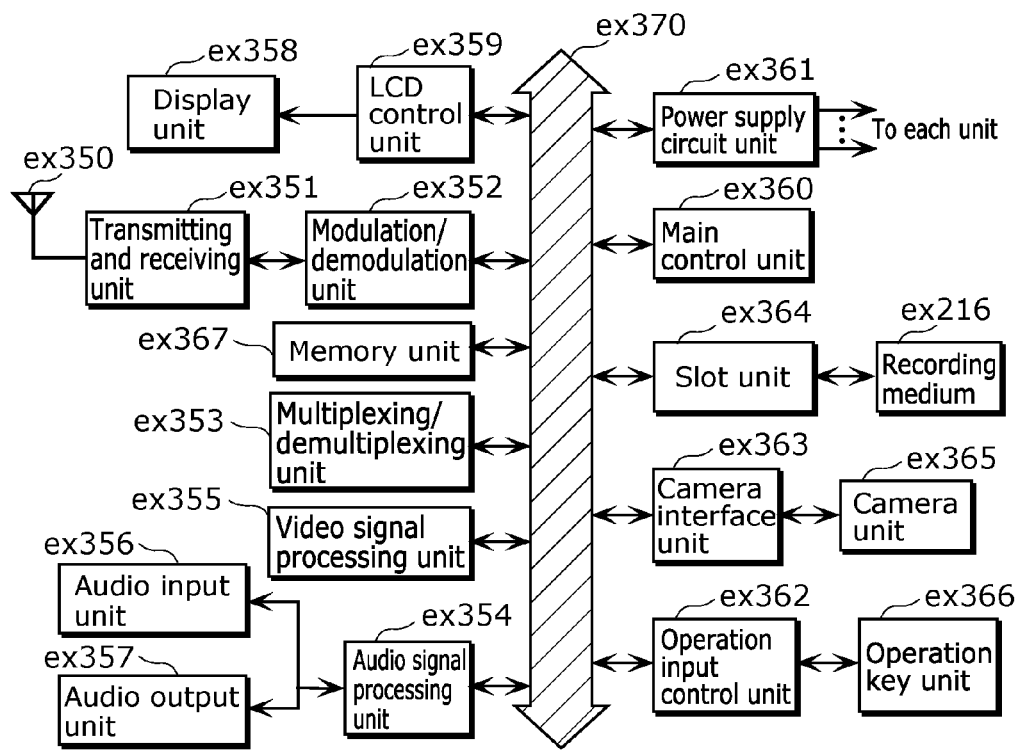
FIG. 27B is a block diagram showing an example of a configuration of a cellular phone.

Next, an example of a configuration of the cellular phone ex114 will be described with reference to FIG. 27B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments, and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably has 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the inventive concept is not limited to each of embodiments, and various modifications and revisions can be made in any of the embodiments in the present disclosure.

Embodiment 6

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 28 illustrates a structure of the multiplexed data. As illustrated in FIG. 28, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 29:
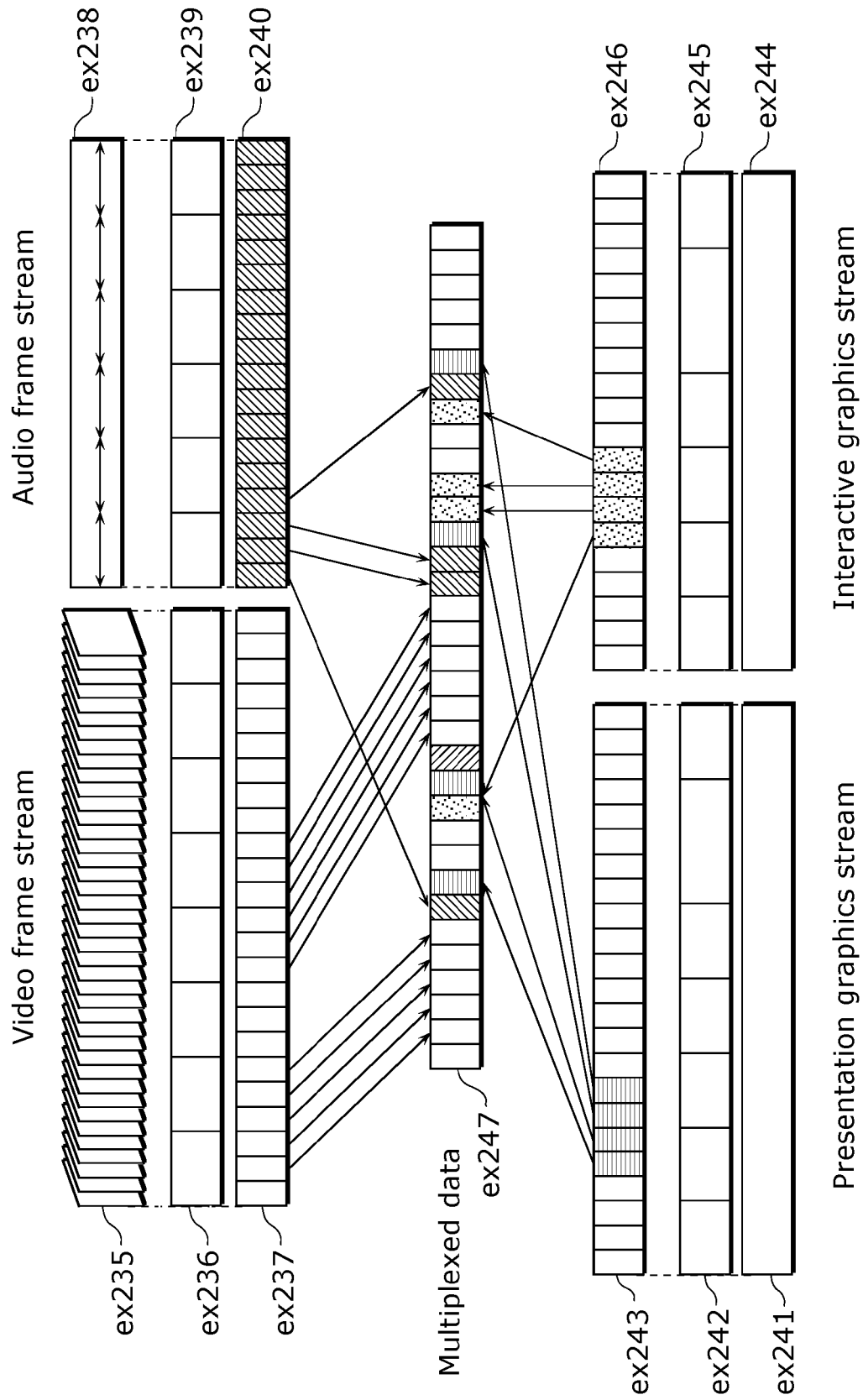
FIG. 29 schematically shows how each stream is multiplexed in multiplexed data.

FIG. 29 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 30:
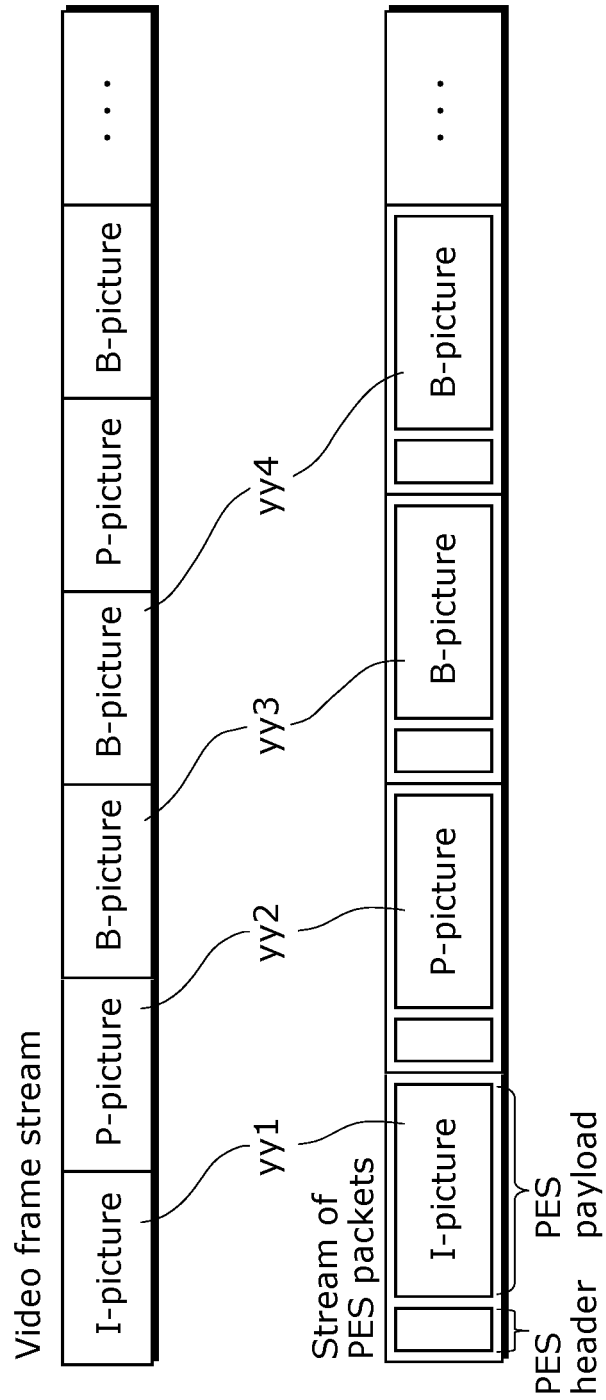
FIG. 30 shows how a video stream is stored in a stream of PES packets in more detail.

FIG. 30 illustrates how a video stream is stored in a stream of PES packets in more detail. The first bar in FIG. 30 shows a video frame stream in a video stream. The second bar shows the stream of PES packets. As indicated by arrows denoted as yy1, yy2, yy3, and yy4 in FIG. 30, the video stream is divided into pictures as I-pictures, B-pictures, and P-pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 31 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 31. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 32:
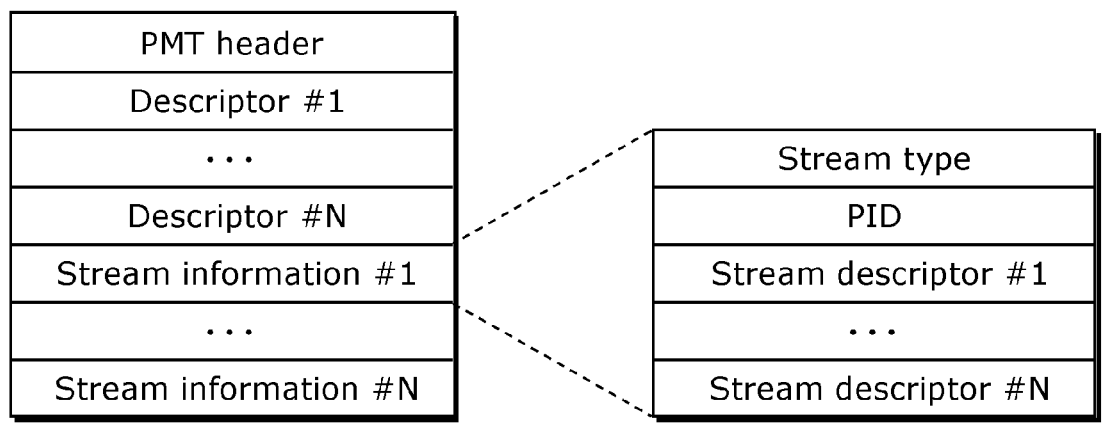
FIG. 32 shows a data structure of a PMT.

FIG. 32 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 33:
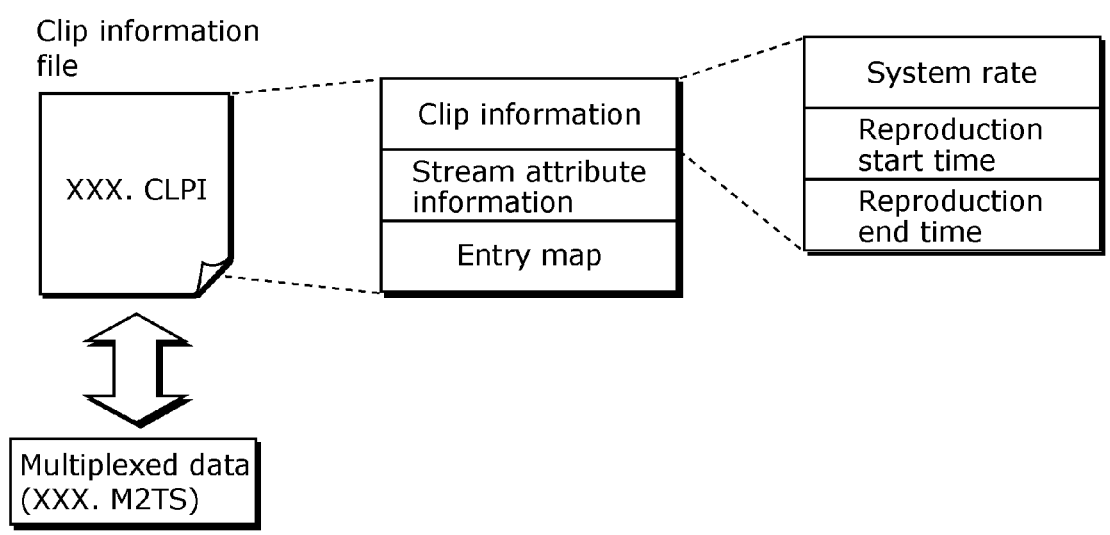
FIG. 33 shows an internal structure of multiplexed data information.

Each of the multiplexed data information files is management information of the multiplexed data as shown in FIG. 33. The multiplexed data information files are in one to one correspondence with the multiplexed data, and each of the files includes multiplexed data information, stream attribute information, and an entry map.

As illustrated in FIG. 33, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 34:
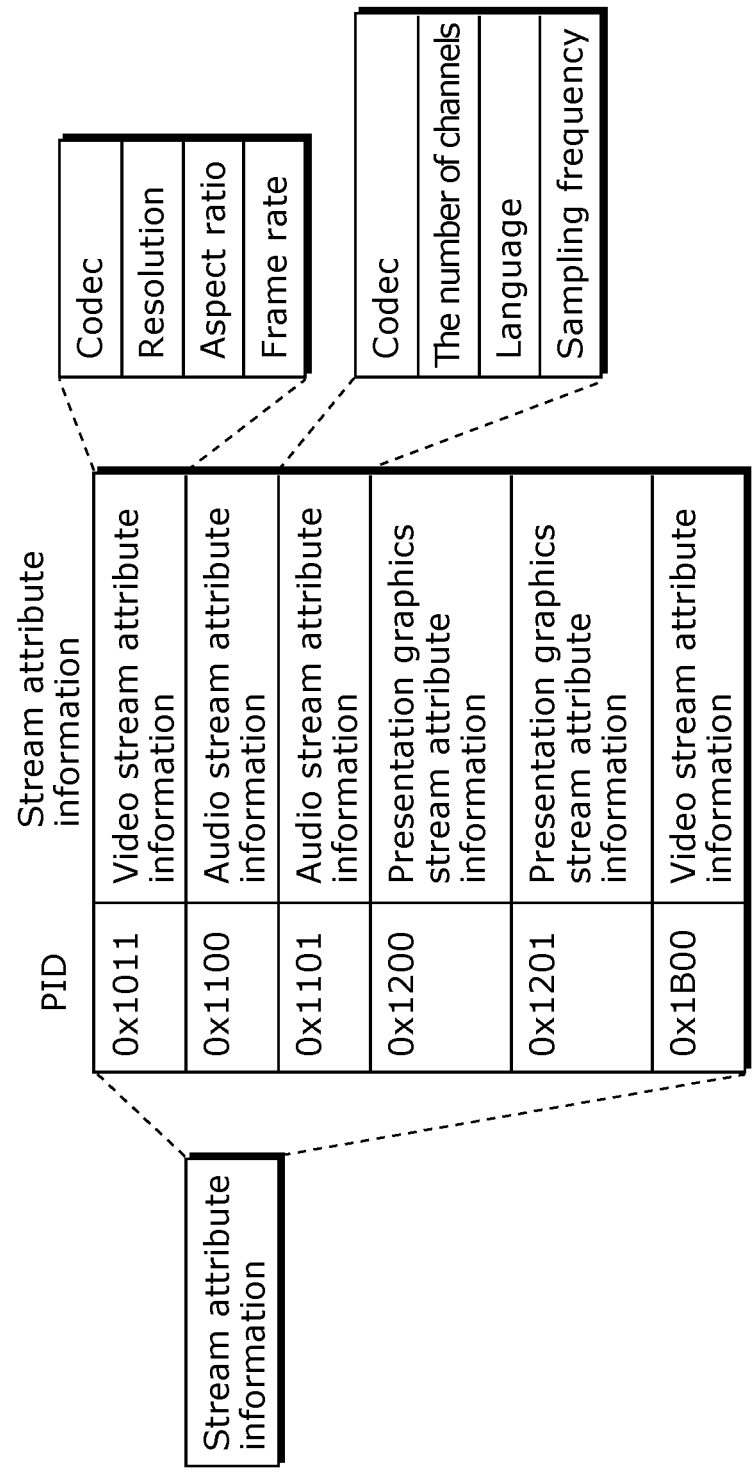
FIG. 34 shows an internal structure of stream attribute information.

As shown in FIG. 34, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 35:
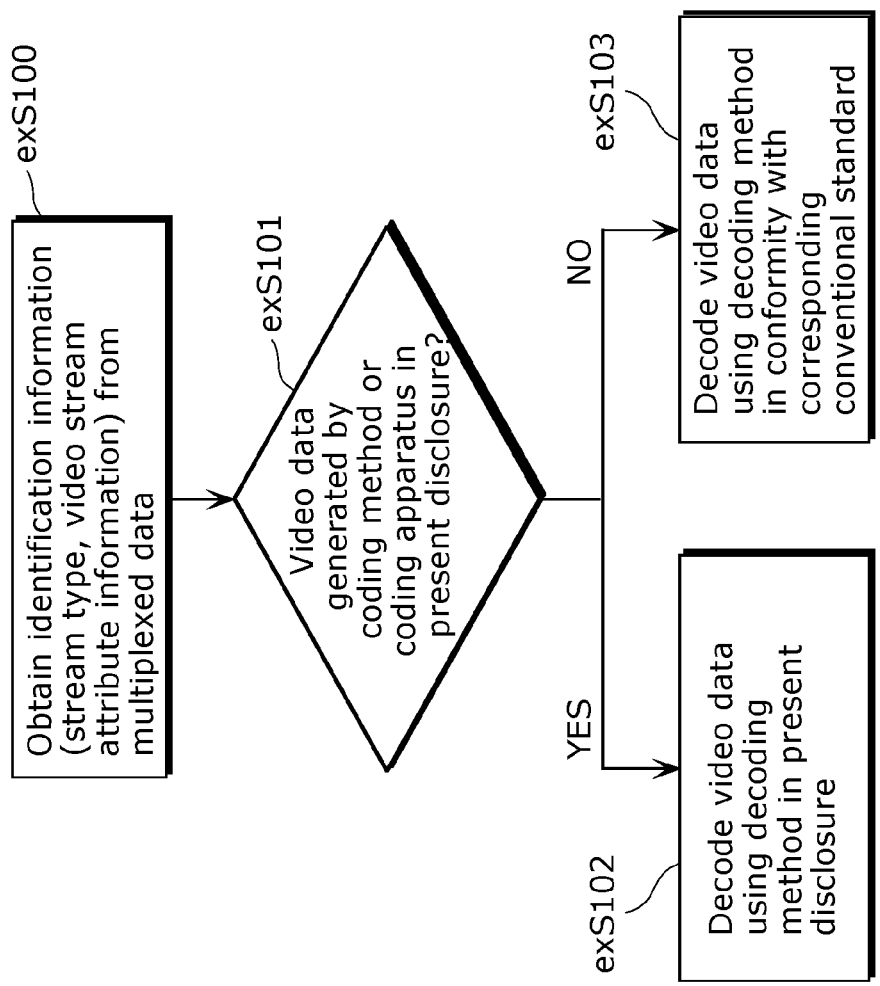
FIG. 35 shows steps for identifying video data.

Furthermore, FIG. 35 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 7

Figure 36:
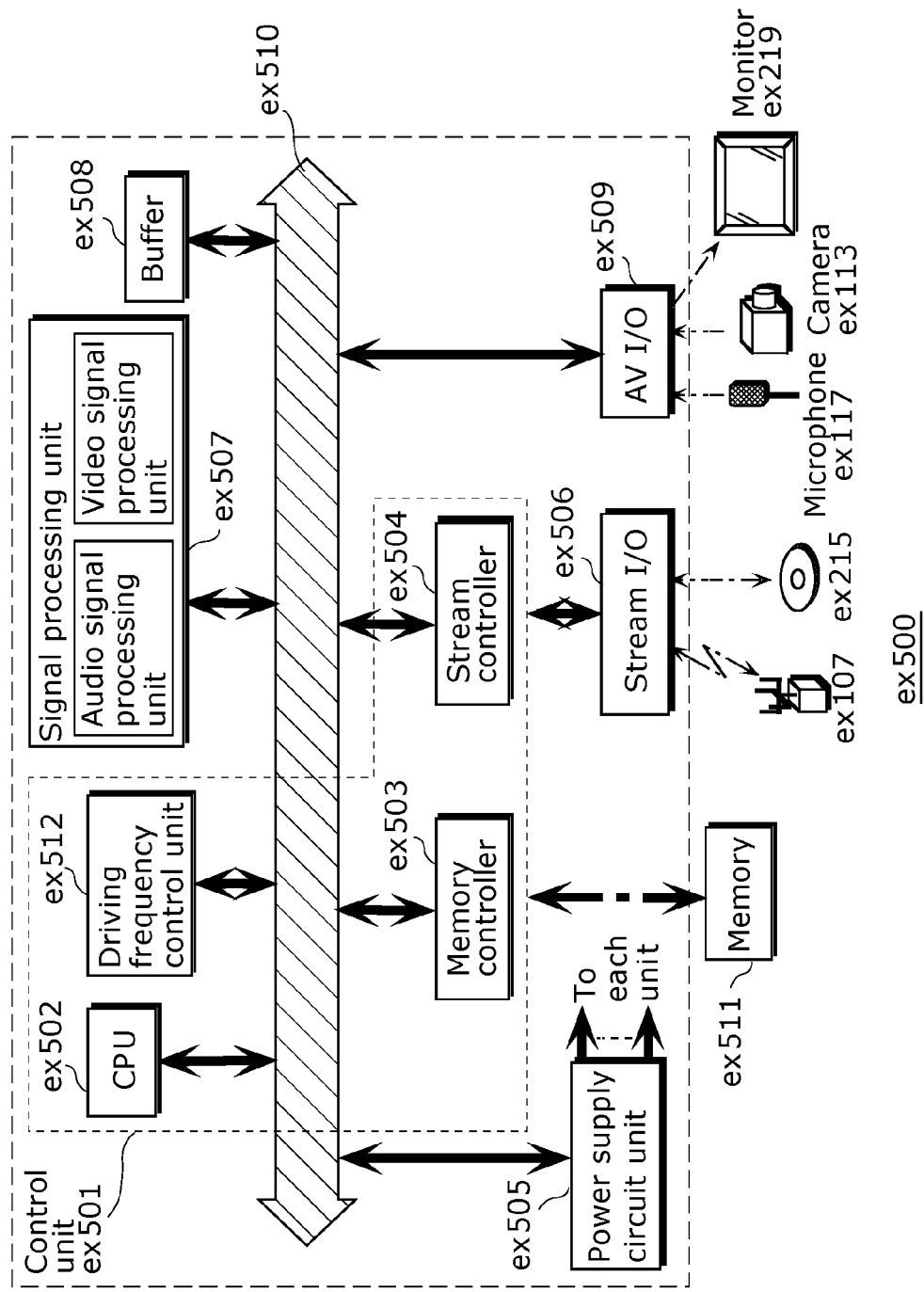
FIG. 36 is a block diagram showing an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 36 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream TO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 8

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 37:
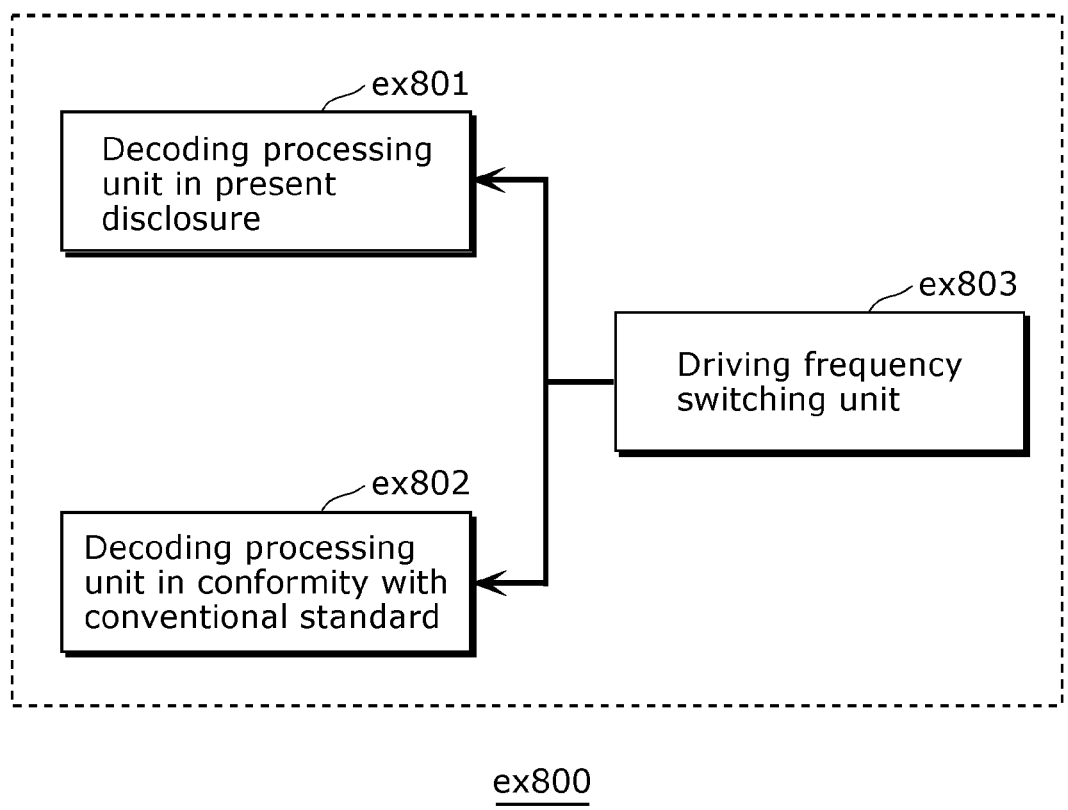
FIG. 37 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 37 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 36. Here, each of the decoding processing unit ex801 that executes the moving picture decoding method described in each of embodiments and the decoding processing unit ex802 that conforms to the conventional standard corresponds to the signal processing unit ex507 in FIG. 36. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 8 is probably used for identifying the video data. The identification information is not limited to the one described in Embodiment 8 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 39. The driving frequency can be selected by storing the look-up table in the buffer ex508 and in an internal memory of an LSI, and with reference to the look-up table by the CPU ex502.

Figure 38:
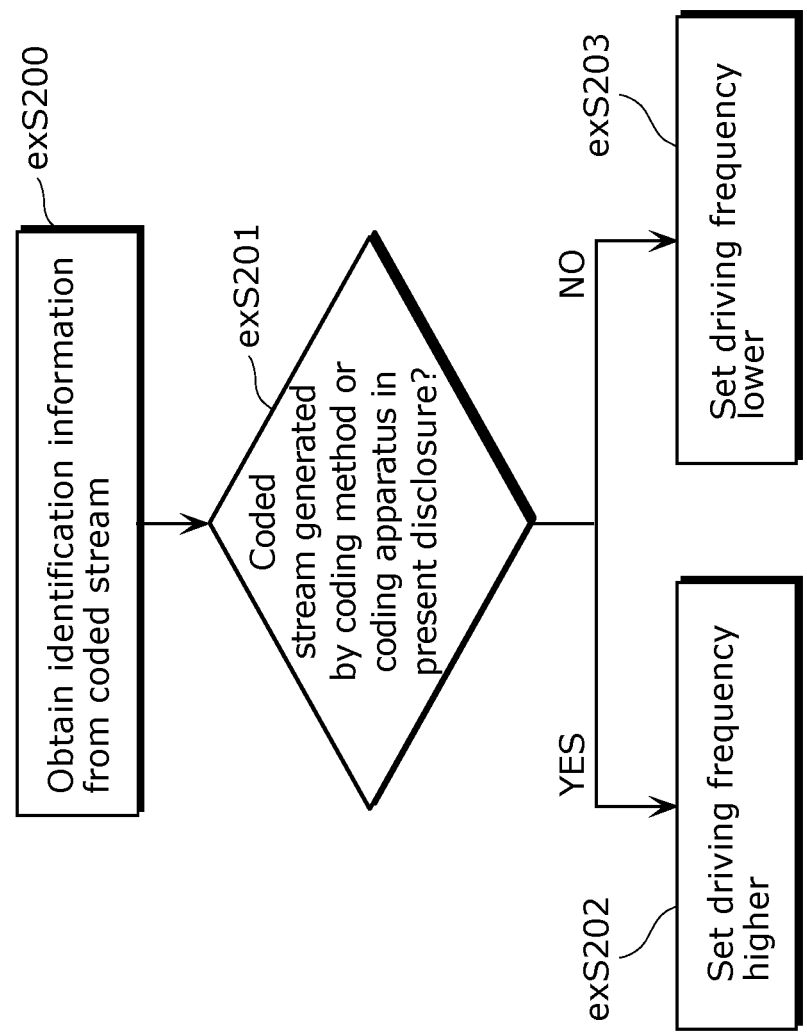
FIG. 38 shows steps for identifying video data and switching between driving frequencies.

FIG. 38 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiments.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 9

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 40A:
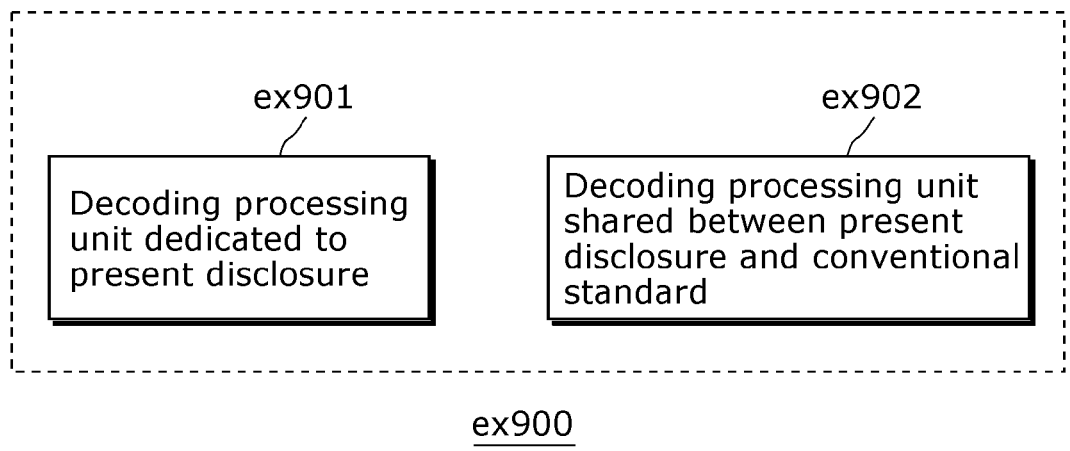
FIG. 40A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 40A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. Since the aspect of the present disclosure is characterized by frame memory control in particular, for example, the dedicated decoding processing unit ex901 is used for frame memory control. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 40B:
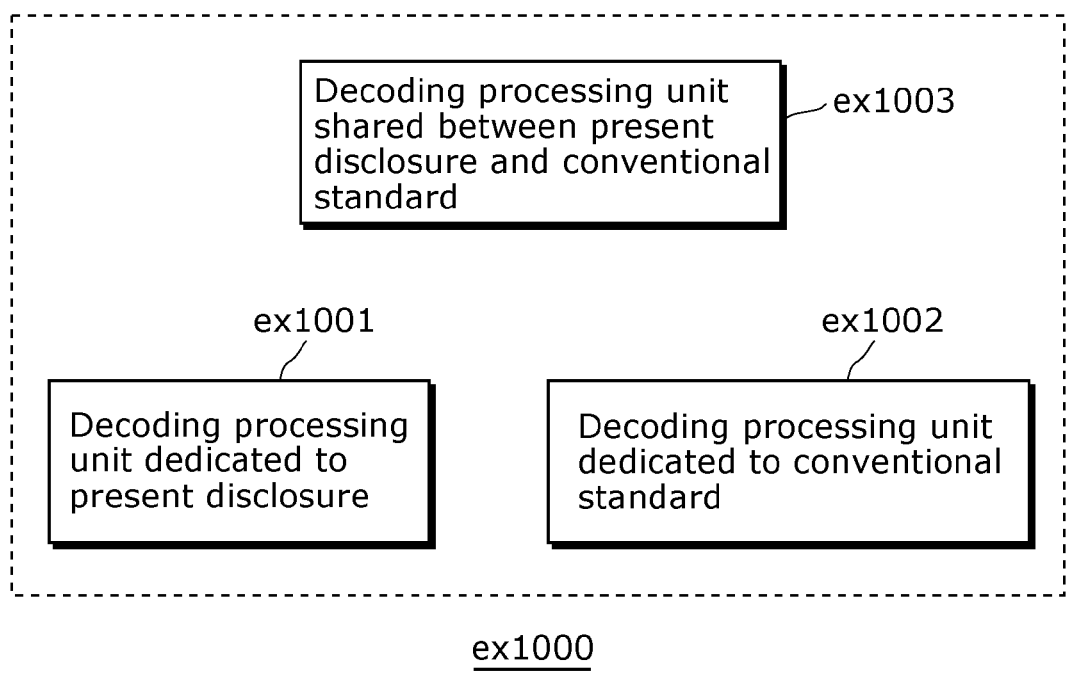
FIG. 40B is a diagram showing another example of a configuration for sharing a module of the signal processing unit.

Furthermore, ex1000 in FIG. 40B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

Although the image coding apparatus and the image decoding apparatus according to one or more aspects of the inventive concepts have been described above, the herein disclosed subject matter is to be considered descriptive and illustrative only. Those skilled in the art will readily appreciate that the appended Claims are of a scope intended to cover and encompass not only the particular embodiments disclosed, but also equivalent structures, methods, and/or uses which are obtained by making various modifications in the embodiments and by arbitrarily combining the structural elements in different embodiments, without materially departing from the principles and spirit of the inventive concept.

INDUSTRIAL APPLICABILITY

The present disclosure is applicable to image coding methods, image decoding methods, image coding apparatuses, and image decoding apparatuses. The present disclosure can be used for information display devices and imaging devices with high resolution which include televisions, digital video recorders, car navigation systems, cellular phones, digital cameras, and digital video cameras.

The invention claimed is:

1. An image decoding method for decoding pictures included in a coded bitstream, the image decoding method comprising:
   obtaining, from a sequence header, buffer descriptions that specify reference pictures to be held in a buffer for decoding the pictures,
   the buffer descriptions including long-term information which identifies a reference picture, among a plurality of reference pictures covered by the buffer descriptions, to be assigned as a long-term reference picture;
   obtaining, from a header of slice in one of the pictures, selecting information for selecting at least one of the buffer descriptions for decoding the slice;
   selecting the at least one of the buffer descriptions from the buffer descriptions by using the selecting information;
   decoding the slice by using the reference picture to be assigned as the long-term reference picture identified by the selected at least one of the buffer descriptions,
   wherein syntax elements
      (i) included in the sequence header and
      (ii) including the buffer descriptions can be used in common for decoding all of the pictures in the coded bitstream,
   wherein syntax elements
      (i) included in the header of the slice and
      (ii) including the selecting information can be used in common for decoding all blocks in the slice,
   and wherein the long-term information, which is obtained from the sequence header, includes
      (i) a long-term index for use to identify the reference picture to be assigned as the long-term reference picture and
      (ii) a unique picture order count (POC) number for use to specify the reference picture identified by the long-term index.

* * * * *

UNITED STATES PATENT AND TRADEMARK OFFICE
CERTIFICATE OF CORRECTION

PATENT NO. : 9,681,148 B2
APPLICATION NO. : 15/336075
DATED : June 13, 2017
INVENTOR(S) : Viktor Wahadaniah It is certified that error appears in the above-identified patent and that said Letters Patent is hereby corrected as shown below:

On the Title Page

IN "OTHER PUBLICATIONS" OF (56) REFERENCES CITED

On page 2, Column 1, Line 71, "Joint Video Team (JCT) of ISO/IEC" should read --Joint Video Team (JVT) of ISO/IEC--;

On page 2, Column 2, Line 4, "Joint Video Team (JCT) of ISO/IEC" should read --Joint Video Team (JVT) of ISO/IEC--;

On page 3, Column 2, Line 18, "JVT-0049, Filename: JVT-C049.doc, $3^{rd}$ Meeting," should read --JVT-C049, Filename: JVT-C049.doc, $3^{rd}$ Meeting,--; and On page 3, Column 2, Line 28, "ISO/IEC TTC1/SC29/WG11," should read --ISO/IEC JTC1/SC29/WG11,--.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*